(12) United States Patent
Ironside

(10) Patent No.: US 12,380,510 B1
(45) Date of Patent: *Aug. 5, 2025

(54) TRAINING GRADIENT BOOSTED DECISION TREES WITH PROGRESSIVE MAXIMUM DEPTH FOR PARSIMONY AND INTERPRETABILITY

(71) Applicant: Liberty Mutual Insurance Company, Boston, MA (US)

(72) Inventor: Brian Ironside, Renton, WA (US)

(73) Assignee: Liberty Mutual Insurance Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,518

(22) Filed: Jul. 28, 2023

Related U.S. Application Data

(63) Continuation of application No. 17/192,502, filed on Mar. 4, 2021, now Pat. No. 12,260,460, which is a continuation of application No. 16/147,154, filed on Sep. 28, 2018, now Pat. No. 10,977,737.

(60) Provisional application No. 62/615,691, filed on Jan. 10, 2018.

(51) Int. Cl.
| | |
|---|---|
| *G06N 5/01* | (2023.01) |
| *G06F 16/20* | (2019.01) |
| *G06F 18/214* | (2023.01) |
| *G06F 18/243* | (2023.01) |
| *G06N 5/00* | (2023.01) |
| *G06N 20/00* | (2019.01) |
| *G06Q 40/08* | (2012.01) |

(52) U.S. Cl.
CPC ............. *G06Q 40/08* (2013.01); *G06F 16/20* (2019.01); *G06F 18/214* (2023.01); *G06F 18/24323* (2023.01); *G06N 5/01* (2023.01); *G06N 20/00* (2019.01); *G06N 5/00* (2013.01)

(58) Field of Classification Search
CPC .......... G06N 20/00; G06N 20/20; G06N 5/04; G06N 5/01; G06N 5/025; G06N 3/04; G06N 5/022; G06N 7/01; G06N 20/10; G06N 3/045
See application file for complete search history.

(56) References Cited

U.S. PATENT DOCUMENTS

| | | | |
|---|---|---|---|
| 6,646,572 B1 * | 11/2003 | Brand | ................... G06F 3/0219 341/23 |
| 7,024,033 B2 | 4/2006 | Li et al. | |
| 7,895,291 B2 * | 2/2011 | Zuckerman | ......... G06F 16/1834 370/254 |
| 9,280,740 B1 | 3/2016 | Laxmanan et al. | |
| 9,639,807 B2 | 5/2017 | Berengueres et al. | |
| 10,977,737 B2 | 4/2021 | Ironside | |
| 2003/0176931 A1 | 9/2003 | Pednault et al. | |
| 2005/0096880 A1 | 5/2005 | Morita et al. | |

(Continued)

OTHER PUBLICATIONS

U.S. Appl. No. 17/192,502, filed Mar. 4, 2021, Pending.

(Continued)

*Primary Examiner* — Luis A Sitiriche
(74) *Attorney, Agent, or Firm* — ALSTON & BIRD LLP

(57) ABSTRACT

An apparatus for generating a generalized linear model structure definition by generating a gradient boosted tree model and separating each decision tree into a plurality of indicator variables upon which a dependent variable of the generalized linear model depends.

19 Claims, 30 Drawing Sheets

(56) References Cited

U.S. PATENT DOCUMENTS

| | | |
|---|---|---|
| 2007/0288417 A1 | 12/2007 | Aggarwal et al. |
| 2008/0201340 A1 | 8/2008 | Thonangi |
| 2013/0166485 A1 | 6/2013 | Hoffmann |
| 2015/0379426 A1 | 12/2015 | Steele et al. |
| 2016/0078361 A1 | 3/2016 | Brueckner et al. |
| 2016/0321549 A1 | 11/2016 | Kuvshynov et al. |
| 2018/0217991 A1 | 8/2018 | Dato et al. |
| 2018/0293292 A1 | 10/2018 | Odibat et al. |
| 2018/0336487 A1 | 11/2018 | Moore et al. |
| 2018/0349382 A1 | 12/2018 | Kumaran et al. |
| 2019/0164213 A1* | 5/2019 | Lin .................. G06N 20/20 |
| 2019/0213685 A1 | 7/2019 | Ironside |

OTHER PUBLICATIONS

U.S. Appl. No. 16/147,154, filed Sep. 28, 2018, U.S. Pat. No. 10,977,737, Issued.

Guelman, "Gradient Boosting Trees for Auto Insurance Loss Cost Modeling and Prediction," Expert Systems with Applications, 39:3659-3667, (2012).

Priest, "Efficiently Buidling GLMs: Part 1," Keeping up With the Latest Techiques, 11 pages, (2015). [Retrieved from the Internet Feb. 16, 2018: <URL: http://www.colinpriest.com/2015/07/10/efficiently-building-sims-part-1/>].

Ulrich et al., "Stepwise Regression Using P-Values to Drop Variables With Nonsignificant P-Values," stackoverflow.com, question, 6 pages, (2010). [Retrieved from the Internet Feb. 16, 2018: <URL: https://stackoverflow.com/questions/3701170/stepwise-regression-using-p-values-to-drop-variables-with-nonsignificant-p-value>].

Non-Final Rejection Mailed on May 30, 2024 for U.S. Appl. No. 17/192,502, 58 page(s).

Advisory Action (PTOL-303) Mailed on Aug. 18, 2020 for U.S. Appl. No. 16/147,154, 3 page(s).

Final Rejection Mailed on Jun. 4, 2020 for U.S. Appl. No. 16/147,154, 58 page(s).

Non-Final Rejection Mailed on Nov. 15, 2019 for U.S. Appl. No. 16/147,154, 56 page(s).

Notice of Allowance and Fees Due (PTOL-85) Mailed on Dec. 4, 2020 for U.S. Appl. No. 16/147,154, 22 page(s).

Notice of Allowance and Fees Due (PTOL-85) Mailed on Nov. 26, 2024 for U.S. Appl. No. 17/192,502, 10 page(s).

* cited by examiner

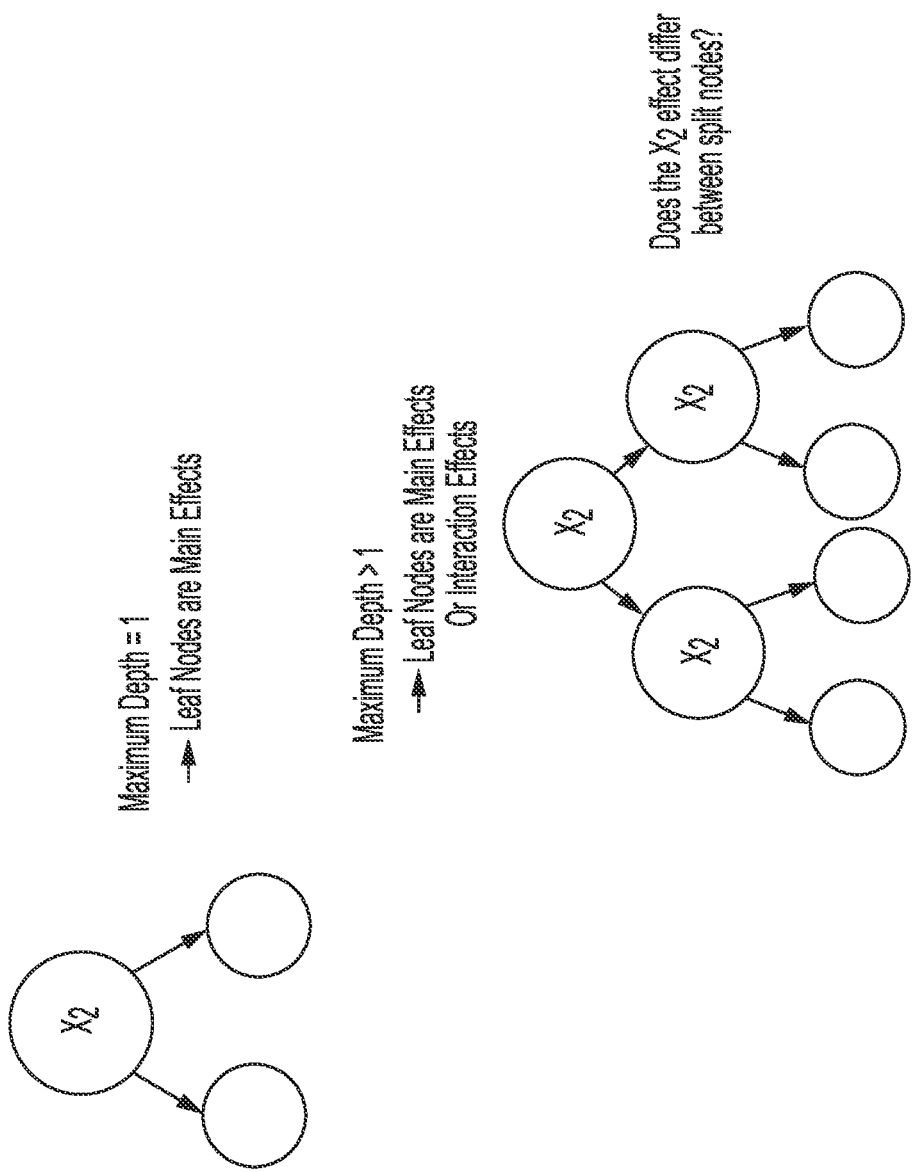

Each leaf definition can define an indicator variable.

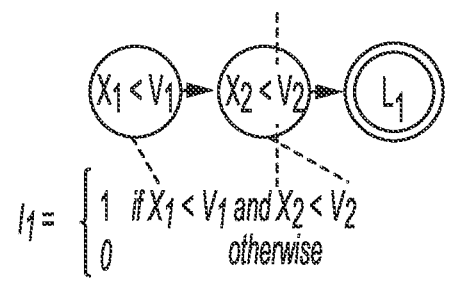

$$I_1 = \begin{cases} 1 & \text{if } X_1 < V_1 \text{ and } X_2 < V_2 \\ 0 & \text{otherwise} \end{cases}$$

The leaf node contains the prediction of the tree model, for records assigned to that leaf node by the splits in the tree.

The parameter ($\beta$) for an indicator variable in a GLM functions identically.
The leaf definition and leaf node provide both GLM structure and GLM estimate.

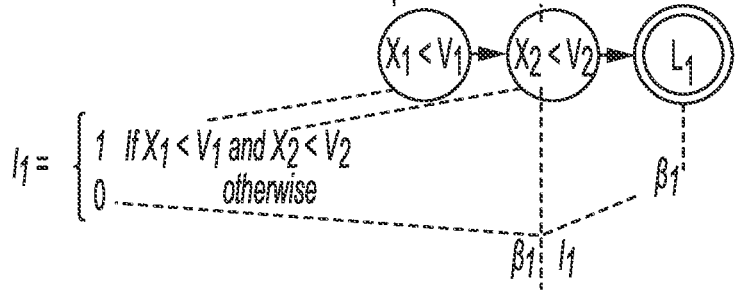

Using the indicator variables $\beta$ estimates, the tree can be expressed as a GLM

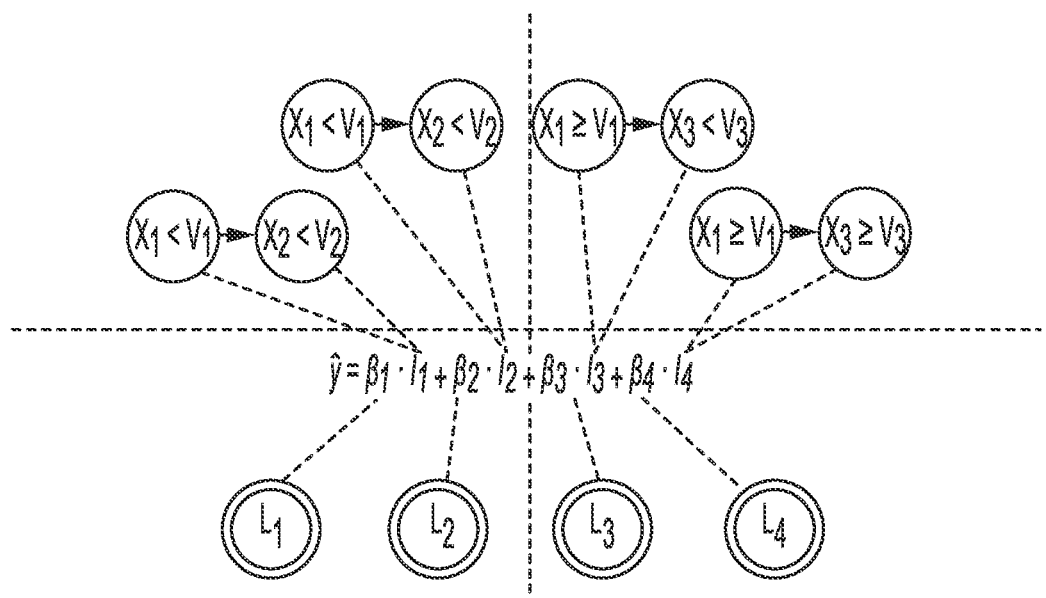

$$\hat{y} = \beta_1 \cdot I_1 + \beta_2 \cdot I_2 + \beta_3 \cdot I_3 + \beta_4 \cdot I_4$$

FIG. 5E-1

Each leaf definition can define an indicator variable.

TRAINING GRADIENT BOOSTED DECISION TREES WITH PROGRESSIVE MAXIMUM DEPTH FOR PARSIMONY AND INTERPRETABILITY

CROSS REFERENCE TO RELATED APPLICATIONS

The present application is a continuation of U.S. application Ser. No. 17/192,502, titled "TRAINING GRADIENT BOOSTED DECISION TREES WITH PROGRESSIVE MAXIMUM DEPTH FOR PARSIMONY AND INTERPRETABILITY," filed, Mar. 4, 2021, which is a continuation of U.S. application Ser. No. 16/147,154, titled "TRAINING GRADIENT BOOSTED DECISION TREES WITH PROGRESSIVE MAXIMUM DEPTH FOR PARSIMONY AND INTERPRETABILITY," filed, Sep. 28, 2018, which claims the benefit of priority to U.S. Provisional Patent Application Ser. No. 62/615,691, titled "TRAINING GRADIENT BOOSTED DECISION TREES WITH PROGRESSIVE MAXIMUM DEPTH FOR PARSIMONY AND INTERPRETABILITY," filed Jan. 10, 2018, the contents of both of which are incorporated herein by reference in their entirety.

BACKGROUND

A Generalized Linear Model (GLM) is a statistical model which relaxes or removes several of the assumptions required by a least-squares linear regression. The flexibility thus gained makes the Generalized Linear Model (GLM) suitable for application to a larger set of data types and prediction problems. As a statistical model, a Generalized Linear Model (GLM) favors analytical rigor and clarity of interpretation over the exhaustive maximization of predictive accuracy. A skilled practitioner must specify which variables will contribute to the model's prediction, and the form of their relationship with the quantity to be predicted. In addition to being very labor intensive, this manual specification process tends to overlook some variables and combinations of variables which could improve the predictive accuracy of the Generalized Linear Model (GLM).

Gradient boosting is a machine learning technique for regression and classification problems which produces a prediction model in the form of an ensemble of weak prediction models, typically decision trees. It builds the model in a stage-wise fashion like other boosting methods do, and it generalizes them by allowing optimization of an arbitrary differentiable loss function. For example, gradient boosting combines weak learners into a single strong learner in an iterative fashion. Gradient boosting tends to aggressively exploit any opportunity to improve predictive accuracy, to the detriment of clarity of interpretation (or, indeed, the feasibility of any interpretation whatsoever).

Applicant has identified a number of deficiencies and problems associated with existing techniques involving generalized linear models (GLMs) and gradient boosting. Through applied effort, ingenuity, and innovation, many of these identified problems have been solved by developing solutions that are included in embodiments of the present disclosure, many examples of which are described in detail herein.

SUMMARY

The present disclosure is directed to methods and apparatuses for generating a generalized linear model definition structure, the method comprising partitioning decision trees of a gradient boosted tree model into a plurality of indicator variables.

An insurance price must estimate the expected number and dollar cost of claims which will be paid out under an insurance contract. This component of an insurance price is also known as "loss cost". Expected loss costs are customarily calculated according to the following formula;

$$E[\text{Loss Costs}] = (\text{Base Rate}) \cdot \prod_{i=1}^{R} \text{Relativity}_i \tag{1}$$

The "base rate" is the expected loss cost for an arbitrarily selected class of risk. The expected losses are increased or decreased by some percent by the application of one or more price "relativities," which are multiplicative factors that indicate risk relative to the selected base class. For example, in auto insurance, it is common to estimate risk based on information about the driver of the insured vehicle, such as the driver's age, and the number of claims they have incurred in prior policy periods. In this simple example, expected loss costs for a young (i.e. inexperienced, and therefore riskier) driver with one or more prior claims (and therefore a higher demonstrated propensity to incur claim costs) would be calculated as follows;

$E[\text{Loss Costs}]=(\text{Base Rate}) \cdot \text{Relativity}_{Driver}$
$_{Age} \cdot \text{Relativity}_{Prior\ Claims}$ $$E[\text{Loss Costs}]=\$100 \cdot 1.5 \cdot 1.2 = \$180 \tag{2}$$

Pricing relativities can be estimated using GLMs, interpreting the main and interaction effects in the GLMs to produce the indicated (estimated) relativities. Such a GLM might have a mathematical form as follows:

$$E[\text{Loss Costs}]=e^{(\beta_0+\beta_{state} \cdot X_{state}+\beta_{age} \cdot X_{age}+\beta_{prior\ claims} \cdot X_{prior\ claims})} \tag{3}$$

Control variables, such as state (e.g., Alaska, New York, etc.), are included in these models, but the estimated relativity for state will not but used in the generation of a price. Instead, differences in risk between states, or over time (and projected in the future) are calculated by other means during the determination of the base rate. As a result of the different treatment of the effects estimated in a GLM for state (and any other control variables), it is critical to the estimation of insurance price relativities to be able to inspect, interpret, and arbitrarily select main and interaction effects from the GLM. If the effect of state is not identified and removed from the relativities estimated by the GLM, it will be "double counted," as the effect is reflected both in the base rate and the relativities.

In a machine learning model, it is not generally possible to identify, inspect, and extract the effects of individual predictors. This prevents identification and removal of control variable effects from the model, thus ensuring such effects will be double counted in the calculation of expected loss costs. This complication renders machine learning models unusable for insurance pricing, denying the predictive modelers access to the increased accuracy such models offer.

The insurance industry is highly regulated, and the prices insurers charge for coverage must be approved by regulators prior to use. Regulators will demand explanations and justification for any proposed price relativities, which will require transparent and interpretable models. Regulations may also prohibit the use of some information for pricing, or dictate limitations in the way permitted information may influence a price. Demonstration of compliance with such regulations also requires transparent and interpretable models.

The inventors have therefore determined that the computing resources dedicated to such demonstration of compliance with such regulations and the creation of transparent and interpretable machine learning models are easily exhausted due to the aforementioned limitations. The inventors have determined that the ability to programmatically generate a generalized linear model structure definition by partitioning decision trees of a gradient boosted tree model into a plurality of indicator variables reduces processing time and required resources and provides interpretability and accuracy over existing methods.

Embodiments of the present disclosure are directed to an apparatus for generating a generalized linear model structure definition.

In embodiments, the apparatus comprises at least one processor and at least one non-transitory computer readable medium storing instructions that, when executed by the at least one processor, cause the apparatus to receive a plurality of data records. In embodiments, each data record of the plurality of records comprising a feature vector comprising plurality of predictor variables, a plurality of corresponding predictor variable values, a dependent variable, and a corresponding dependent variable value.

In embodiments, the apparatus comprises at least one processor and at least one non-transitory computer readable medium storing instructions that, when executed by the at least one processor, cause the apparatus to generate a gradient boosted tree model using the plurality of data records.

In embodiments, generating the gradient boosted tree model comprises forming a first plurality of decision tree structures each having a maximum tree depth of one (1). In embodiments, each decision tree structure comprises a split node and a pair of leaf nodes, and the first plurality of decision tree structures comprises a first number of decision tree structures necessary to exhaust all main effects of the plurality of predictor variables on the dependent variable.

In embodiments, generating the gradient boosted tree model further comprises iteratively forming successive pluralities of decision tree structures each having a maximum tree depth increased by one (1) as compared to its immediately preceding plurality of decision tree structures. In embodiments, each successive plurality of decision tree structures comprising a number of decision tree structures necessary to exhaust all interactions between the plurality of predictor variables. In embodiments, the interactions associated with a number of predictor variables equal to the maximum depth of a current plurality of decision tree structures.

In embodiments, the apparatus comprises at least one processor and at least one non-transitory computer readable medium storing instructions that, when executed by the at least one processor, cause the apparatus to separate each decision tree of each of the successive pluralities of decision tree structures into a plurality of indicator variables represented by the leaf nodes of the decision tree, where the indicator variables are defined by a series of split decisions leading up to each leaf node. In embodiments, each indicator variable is associated with a corresponding coefficient estimate, and each corresponding coefficient estimate is defined by a prediction associated with each leaf node.

In embodiments, the apparatus comprises at least one processor and at least one non-transitory computer readable medium storing instructions that, when executed by the at least one processor, cause the apparatus to reduce the plurality of indicator variables into a first subset of the plurality of indicator variables by combining those indicator variable definitions that are identical and summing the corresponding coefficient estimates.

In embodiments, the apparatus comprises at least one processor and at least one non-transitory computer readable medium storing instructions that, when executed by the at least one processor, cause the apparatus to combine the first subset of the plurality of indicator variables into a generalized linear model structure definition upon which the dependent variable depends.

In embodiments, the apparatus comprises at least one processor and at least one non-transitory computer readable medium storing instructions that, when executed by the at least one processor, cause the apparatus to reduce the first subset of the plurality of indicator variables into a second subset of the plurality of indicator variables, the second subset of the plurality of indicator variables comprising only those indicator variables of the first subset of the plurality of indicator variables whose indicator variables are associated with a common predictor variable.

In embodiments, the apparatus comprises at least one processor and at least one non-transitory computer readable medium storing instructions that, when executed by the at least one processor, cause the apparatus to generate a vector for each possible value of the common predictor variable, the vector comprising a plurality of cells, each cell of the plurality of cells initiated to a null value.

In embodiments, the apparatus comprises at least one processor and at least one non-transitory computer readable medium storing instructions that, when executed by the at least one processor, cause the apparatus to, for each indicator variable of the second subset of the plurality of indicator variables, identify each cell of the plurality of cells satisfying the indicator variable definition, and replace the null value of the cell with a corresponding estimated coefficient associated with the indicator variable. In embodiments, the plurality of indicator variables of the second subset of the plurality of indicator variables comprise differing split values applied to the common predictor variables.

In embodiments, the apparatus comprises at least one processor and at least one non-transitory computer readable medium storing instructions that, when executed by the at least one processor, cause the apparatus to reduce the first subset of the plurality of indicator variables into a second subset of the plurality of indicator variables, the second subset of the plurality of indicator variables comprising only those indicator variables of the first subset of the plurality of indicator variables whose indicator variables are associated with a common predictor variable.

In embodiments, the apparatus comprises at least one processor and at least one non-transitory computer readable medium storing instructions that, when executed by the at least one processor, cause the apparatus to, for each indicator variable of the second subset of the plurality of indicator variables, generate a multi-dimensional array, the multi-dimensional array comprising a plurality of dimension cells, each dimension cell associated with each predictor variable of the indicator variable definition, each dimension cell of the plurality of dimension cells initiated to a null value, identify each dimension cell of the plurality of dimension cells satisfying conditions of the indicator variable definition, and replace the null value of the dimension cell with a corresponding estimated coefficient associated with the indicator variable.

In embodiments, the plurality of indicator variables of the second subset of the plurality of indicator variables comprise differing split values applied to the common predictor variables.

In embodiments, reducing the plurality of indicator variables into a first subset of the plurality of indicator variables by combining those indicator variable definitions that are identical comprises identifying those indicator variable definitions that share one or more successions of conditions, wherein the one or more successions of conditions are not in identical order, and reordering the one or more successions of conditions such that the indicator variable definitions are identical.

In embodiments, the generalized linear model structure definition is used to programmatically generate one or more of predictions of homeowner loss frequency and homeowner loss severity for an insurance provider computing device.

BRIEF DESCRIPTION OF THE DRAWINGS

Figure 1:
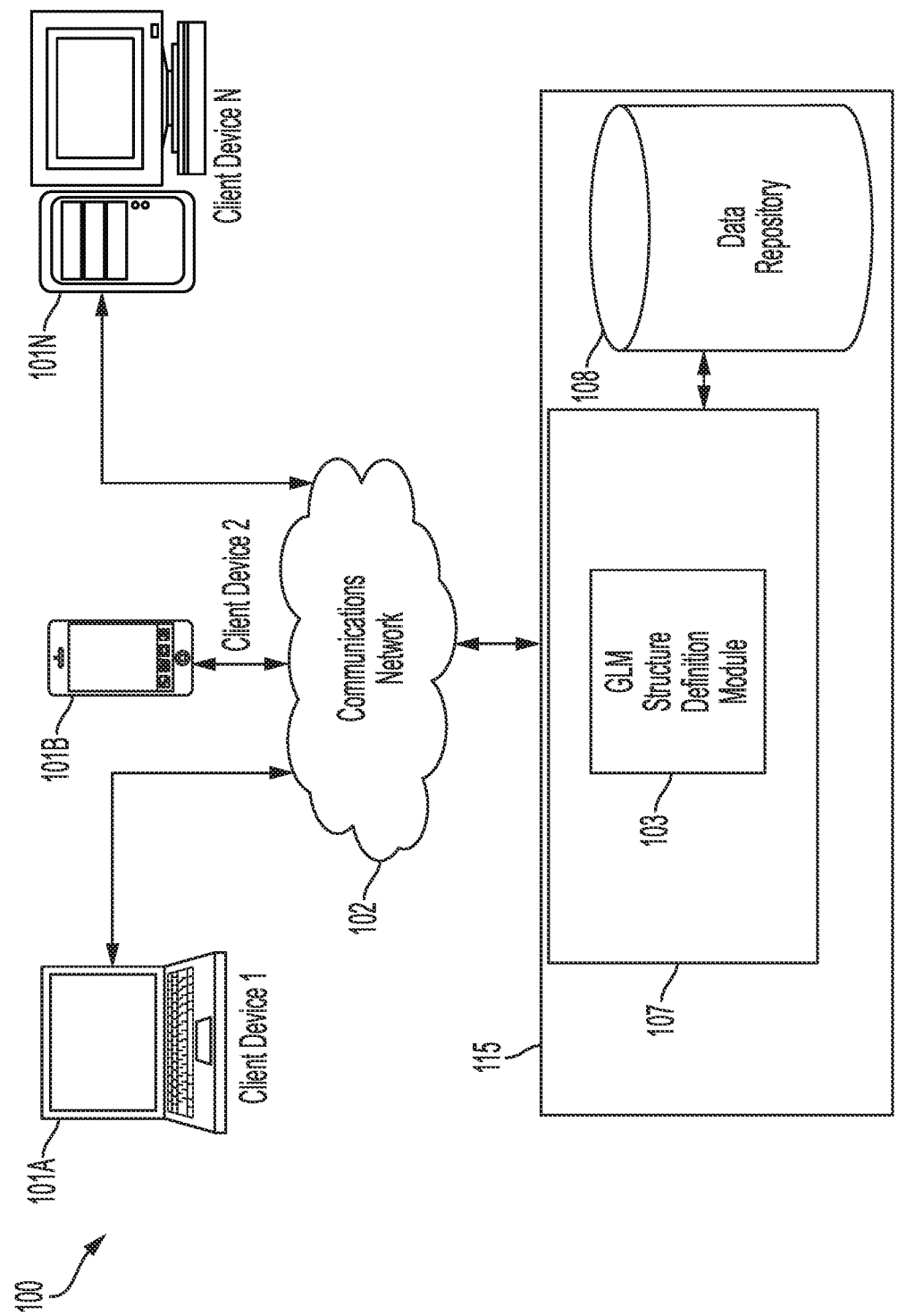
Figure 2:
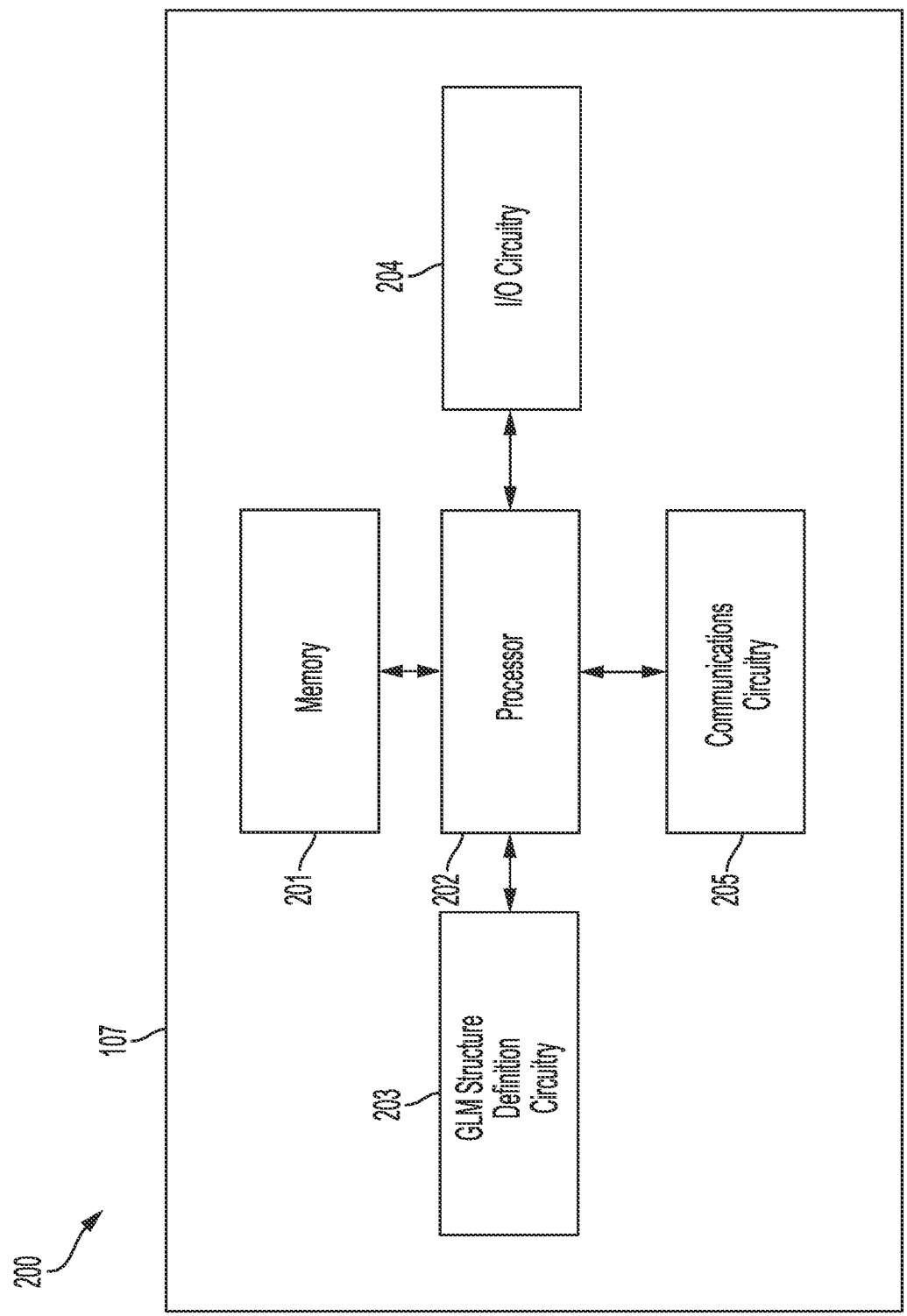
Figure 3A:
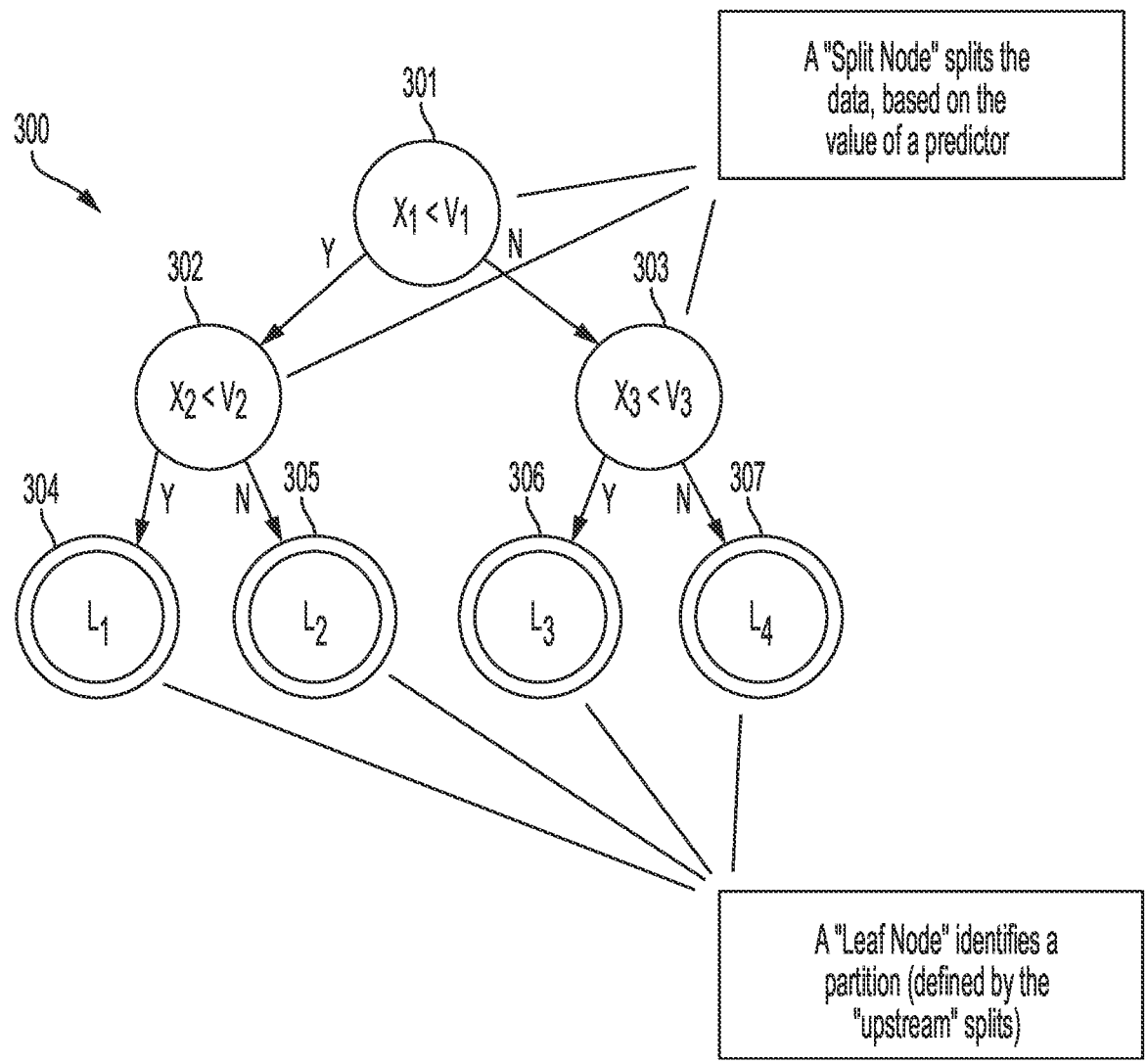
Figure 3B:
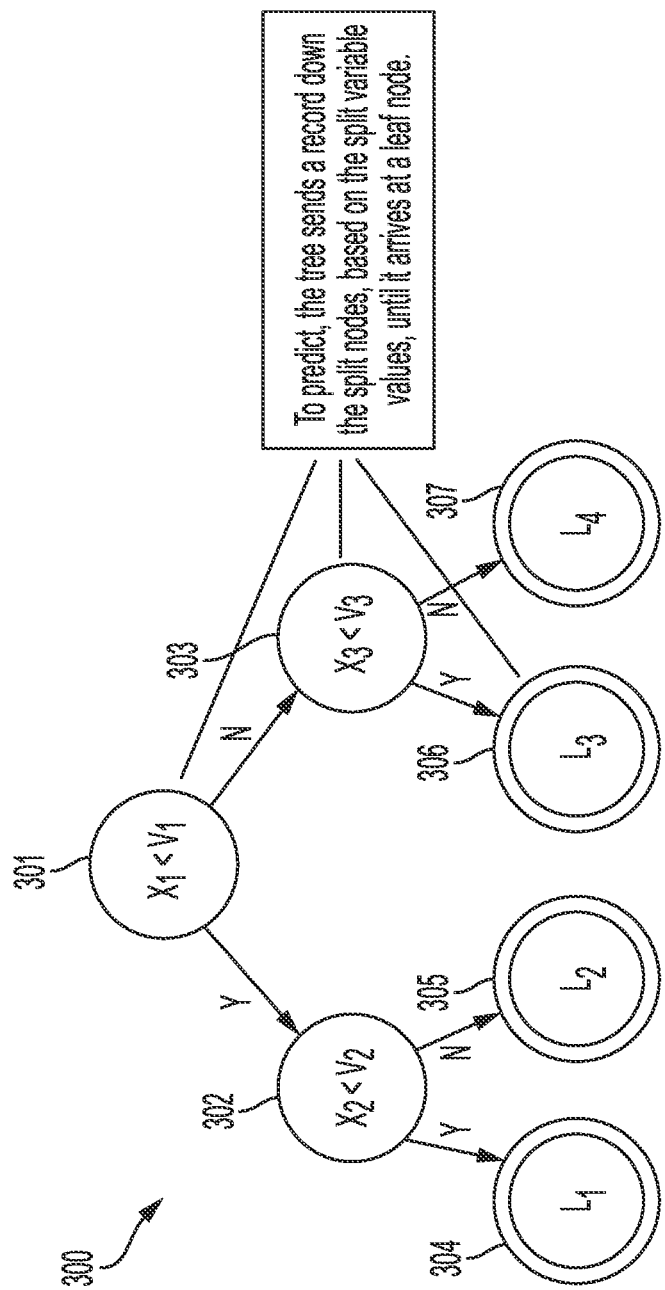
Figure 3C:
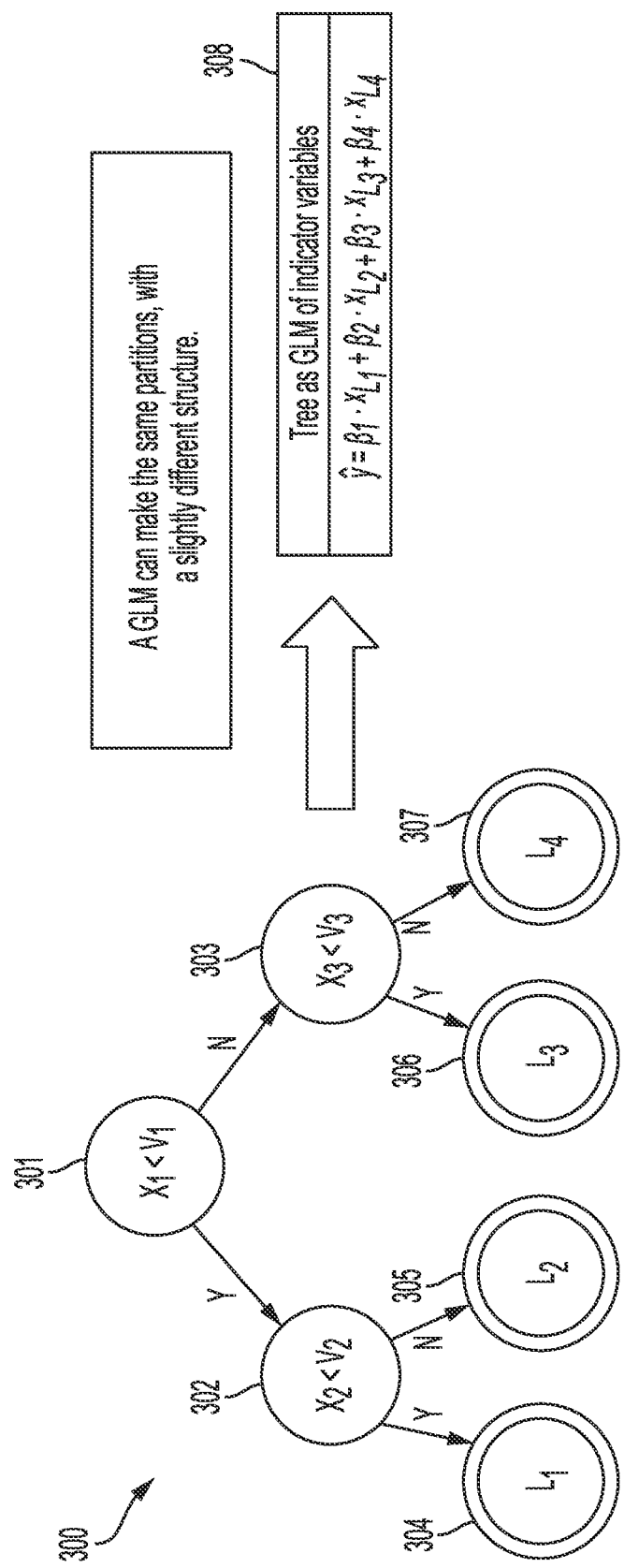
Figure 3D:
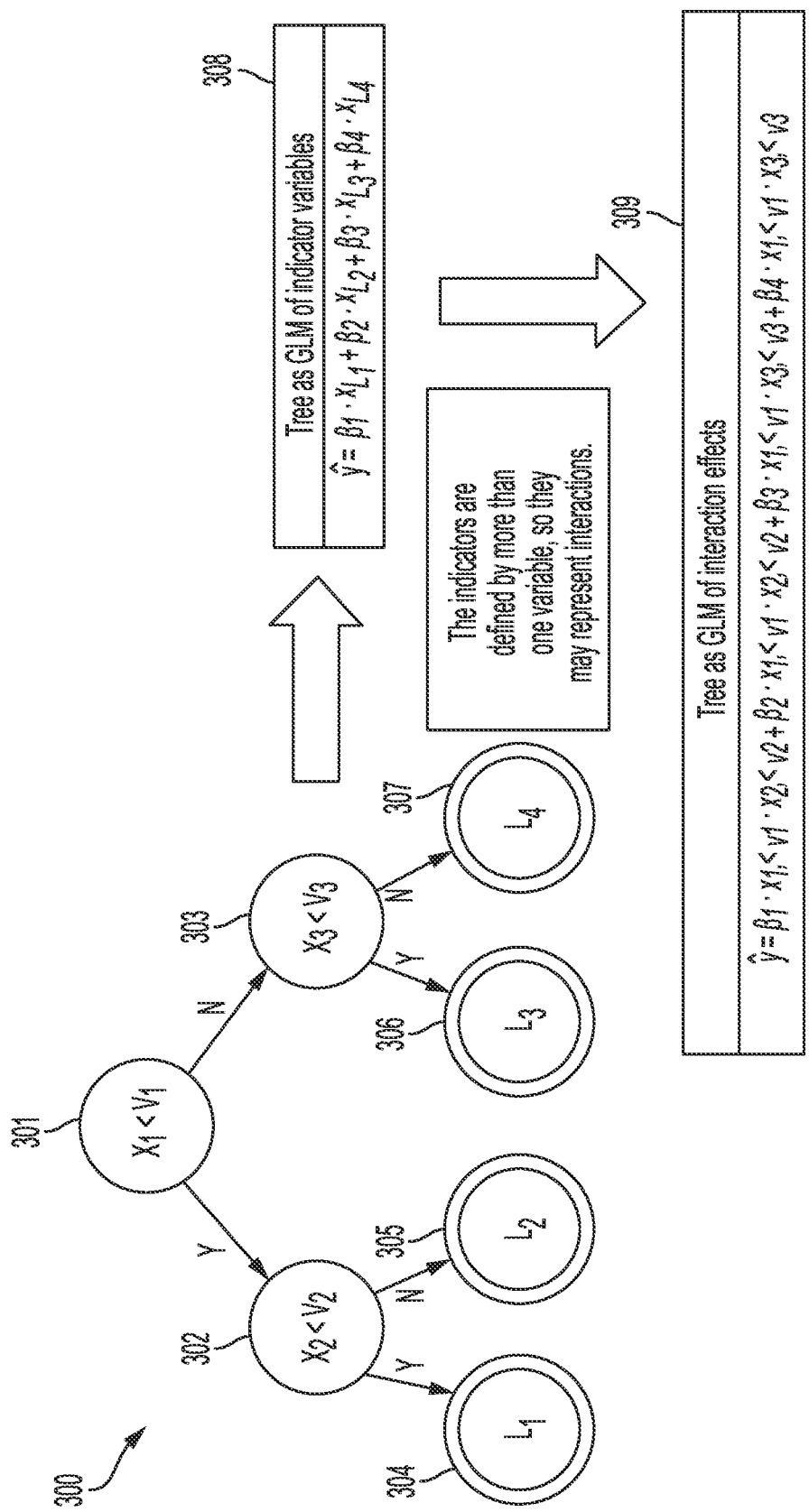
Figure 4B:
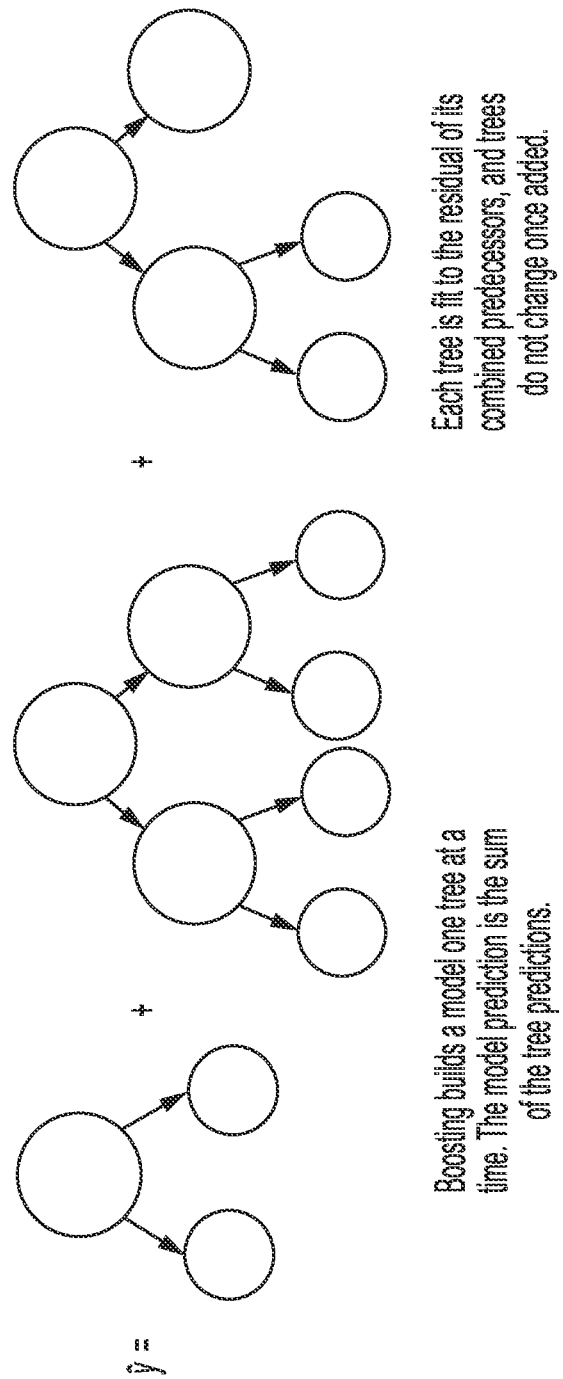
Figure 4C:
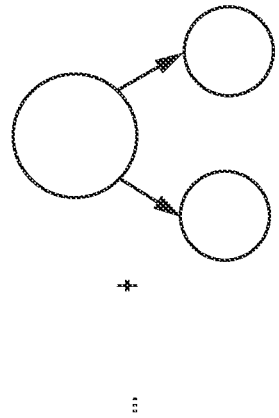
Figure 4C:
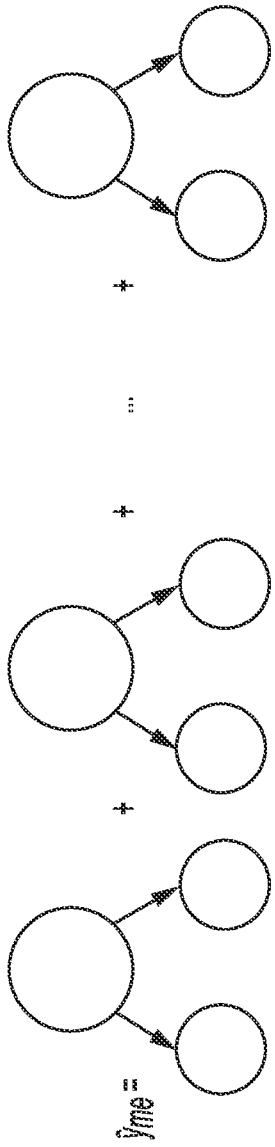
Figure 4C:
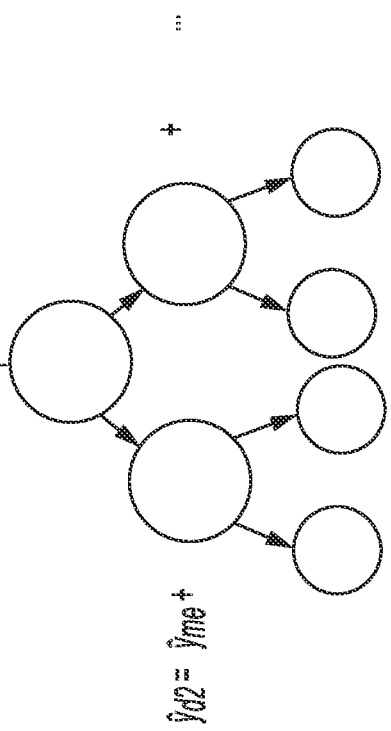
Figure 5A:
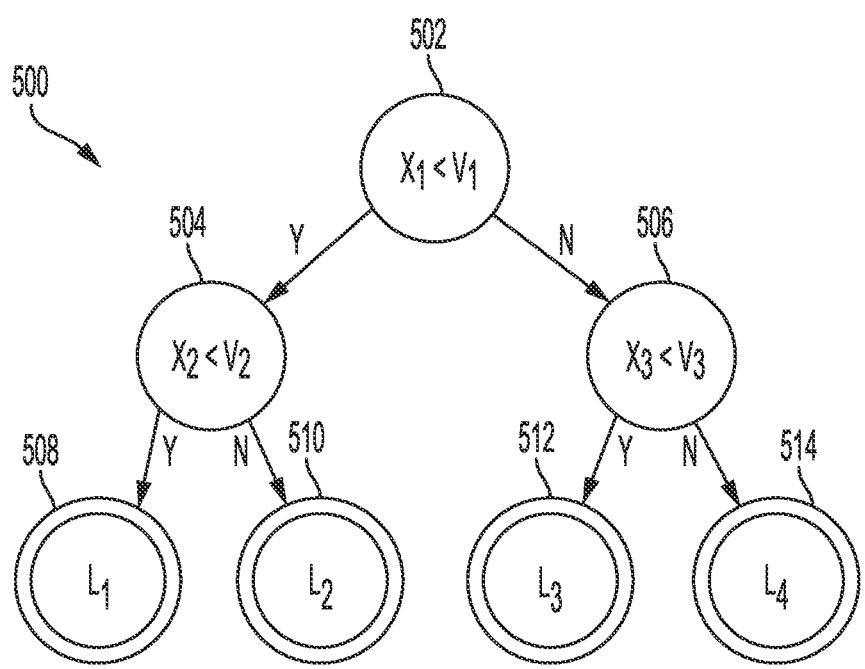
Figure 5B:
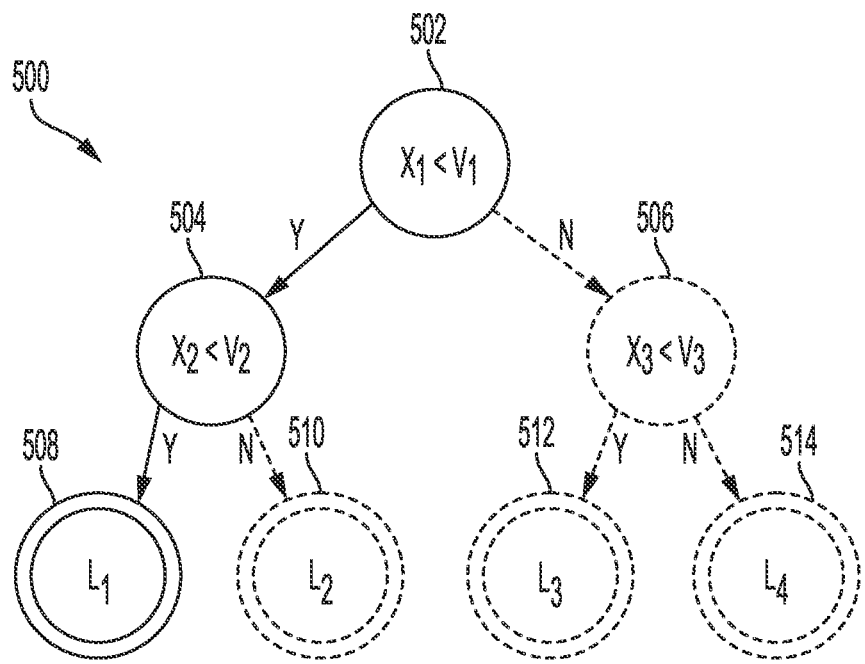
Figure 5C:
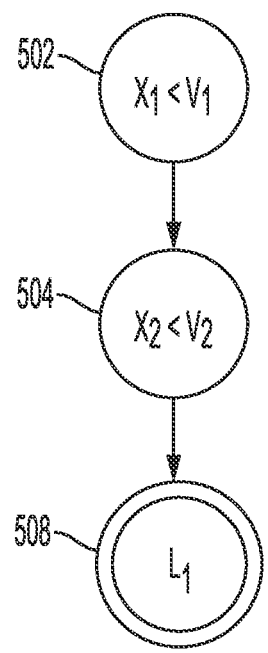
Figure 5D:
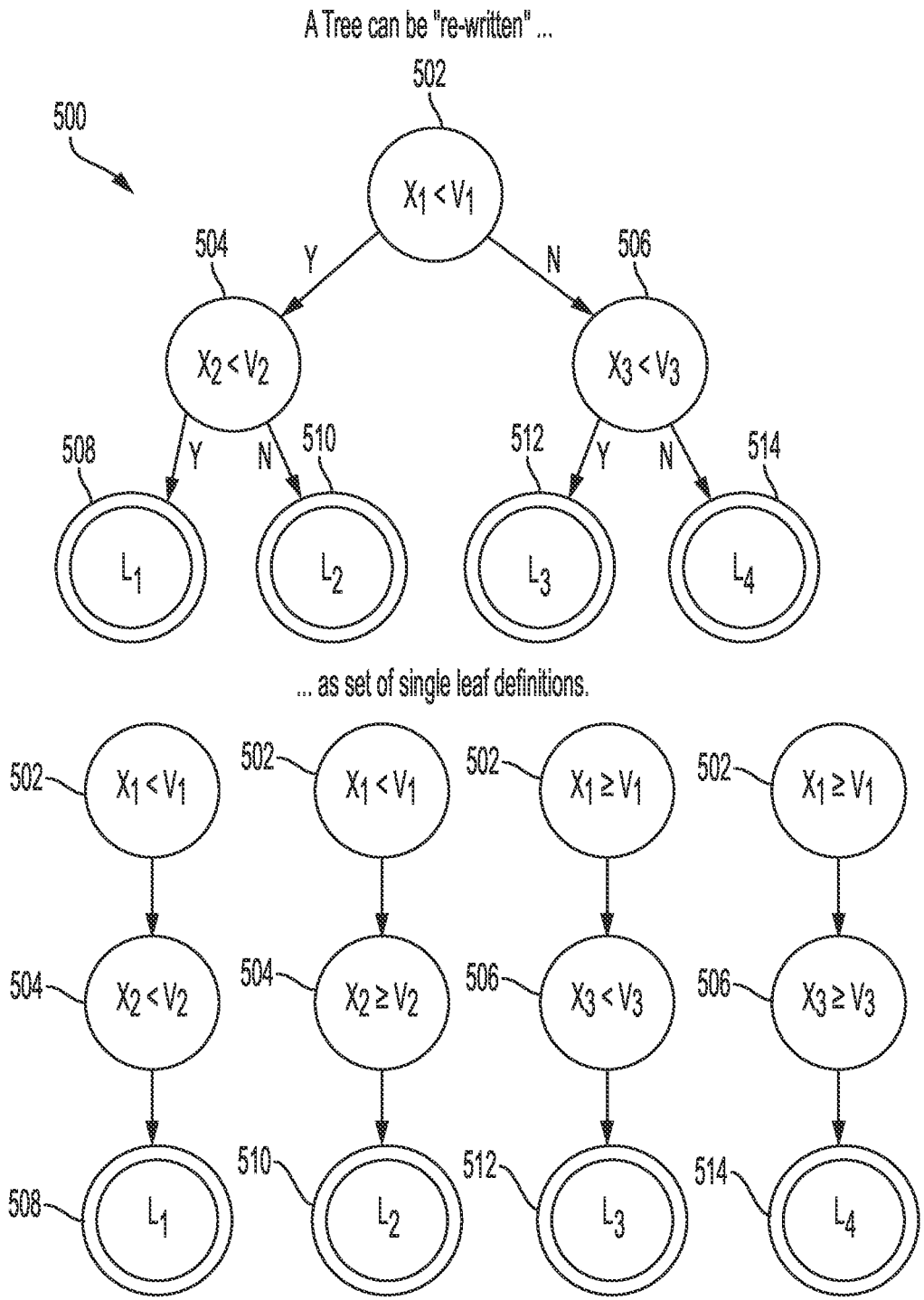
Figure 5E:
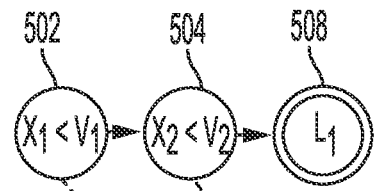
Figure 2:
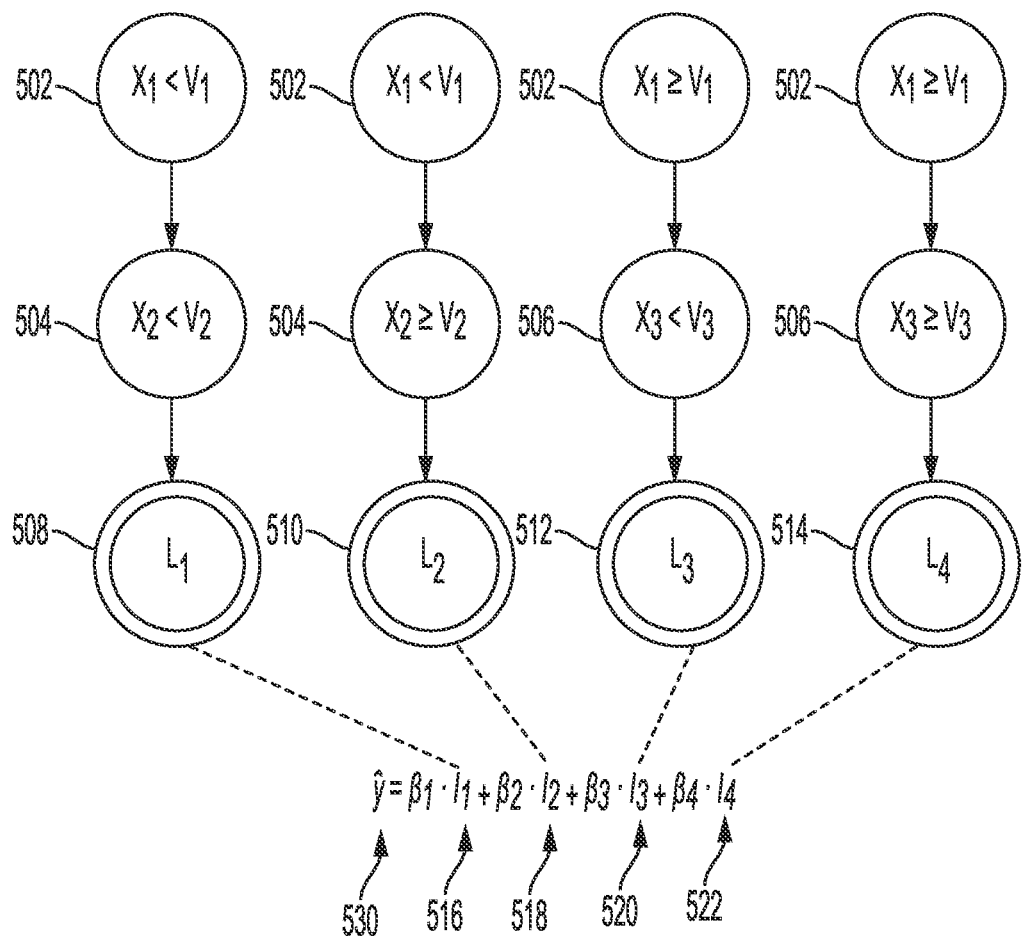
Figure 5E:
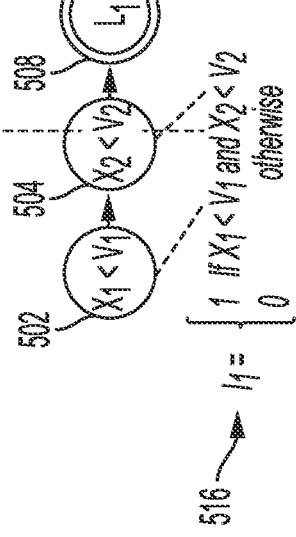
Figure 3:
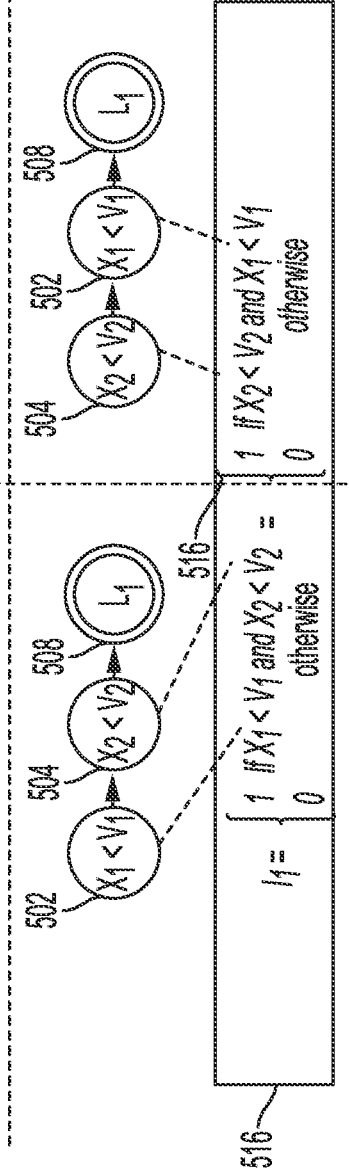
Figure 5F:
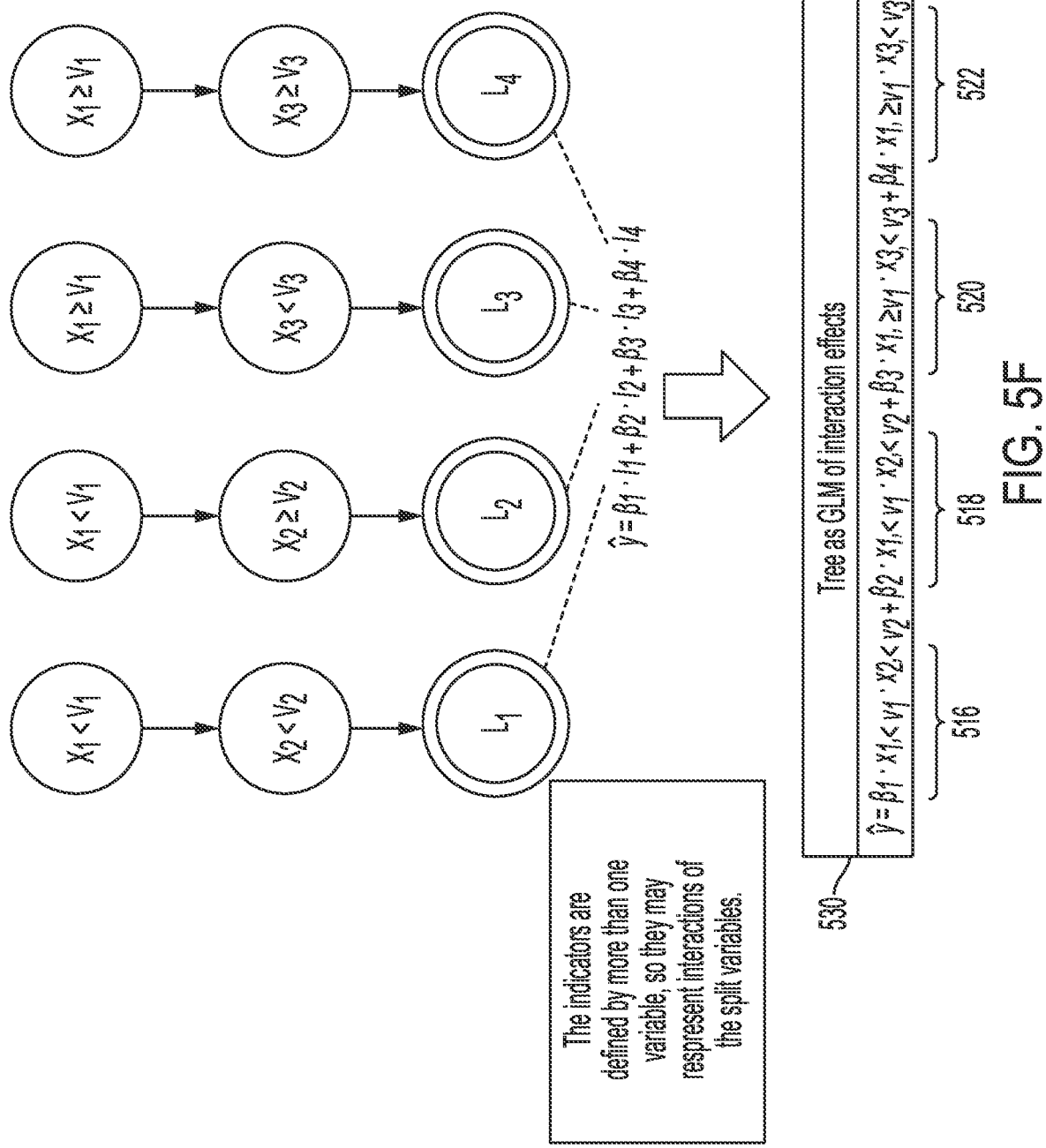
Figure 5G:
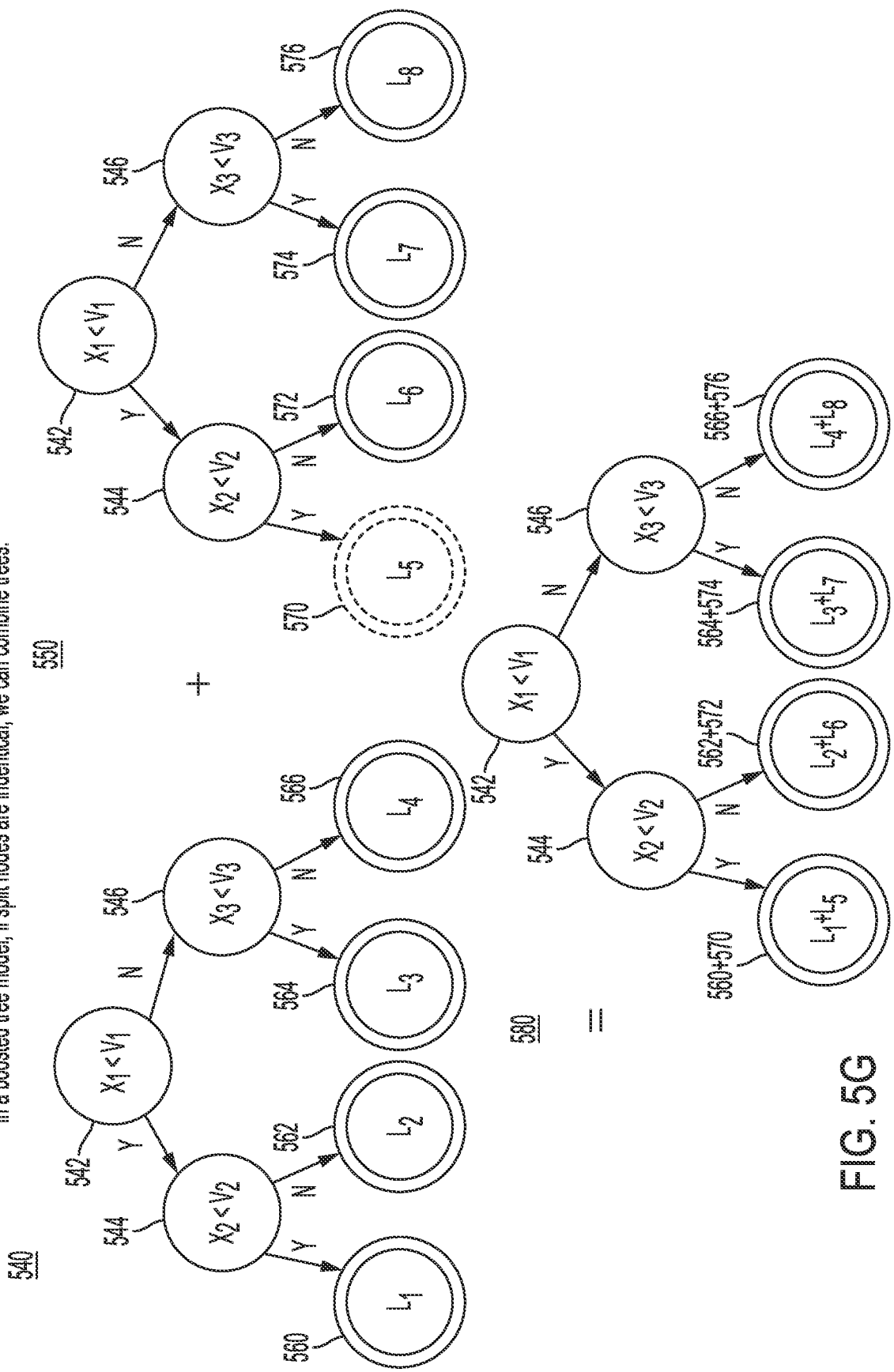
Figures 1, 5H:
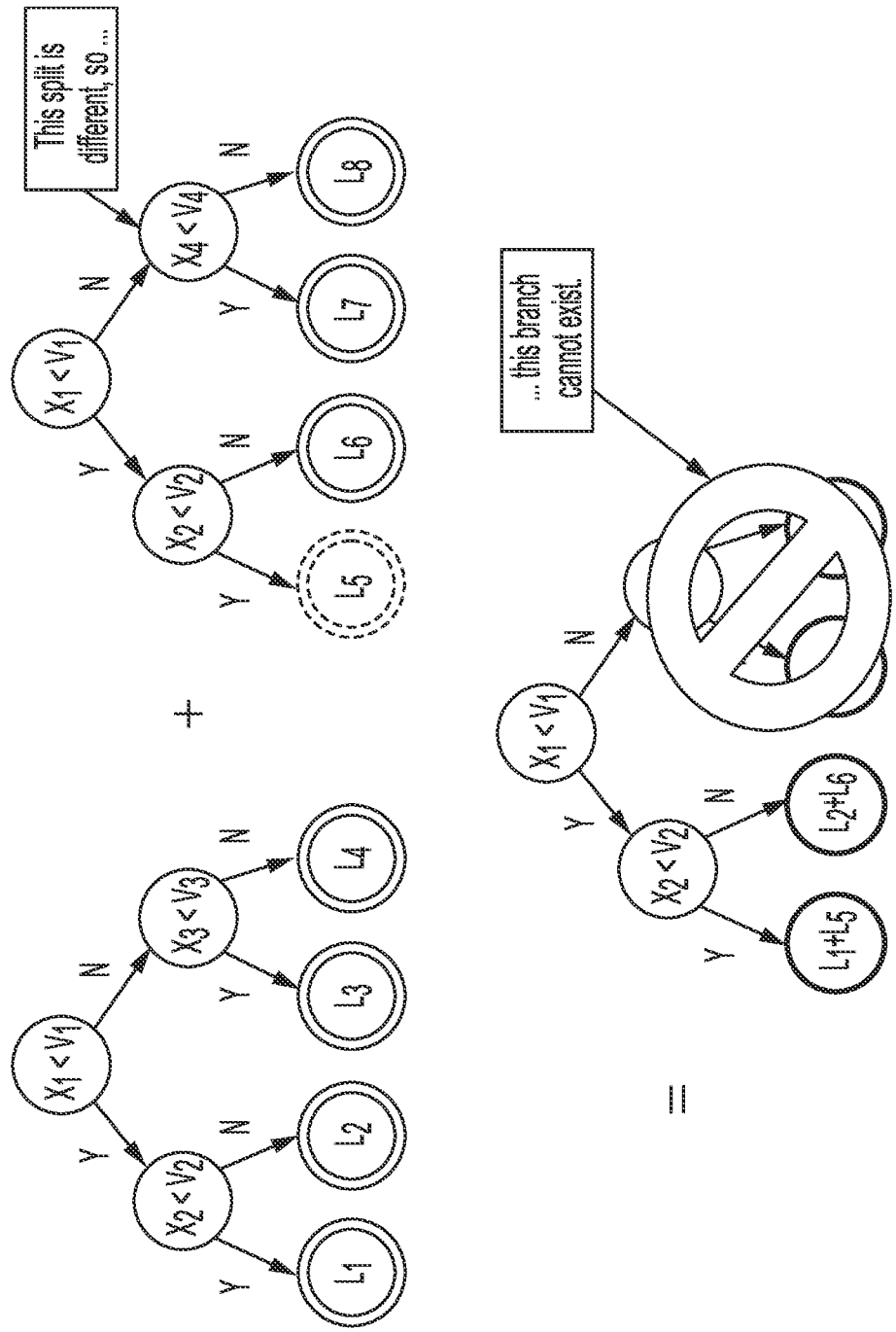
Figures 2, 5H:
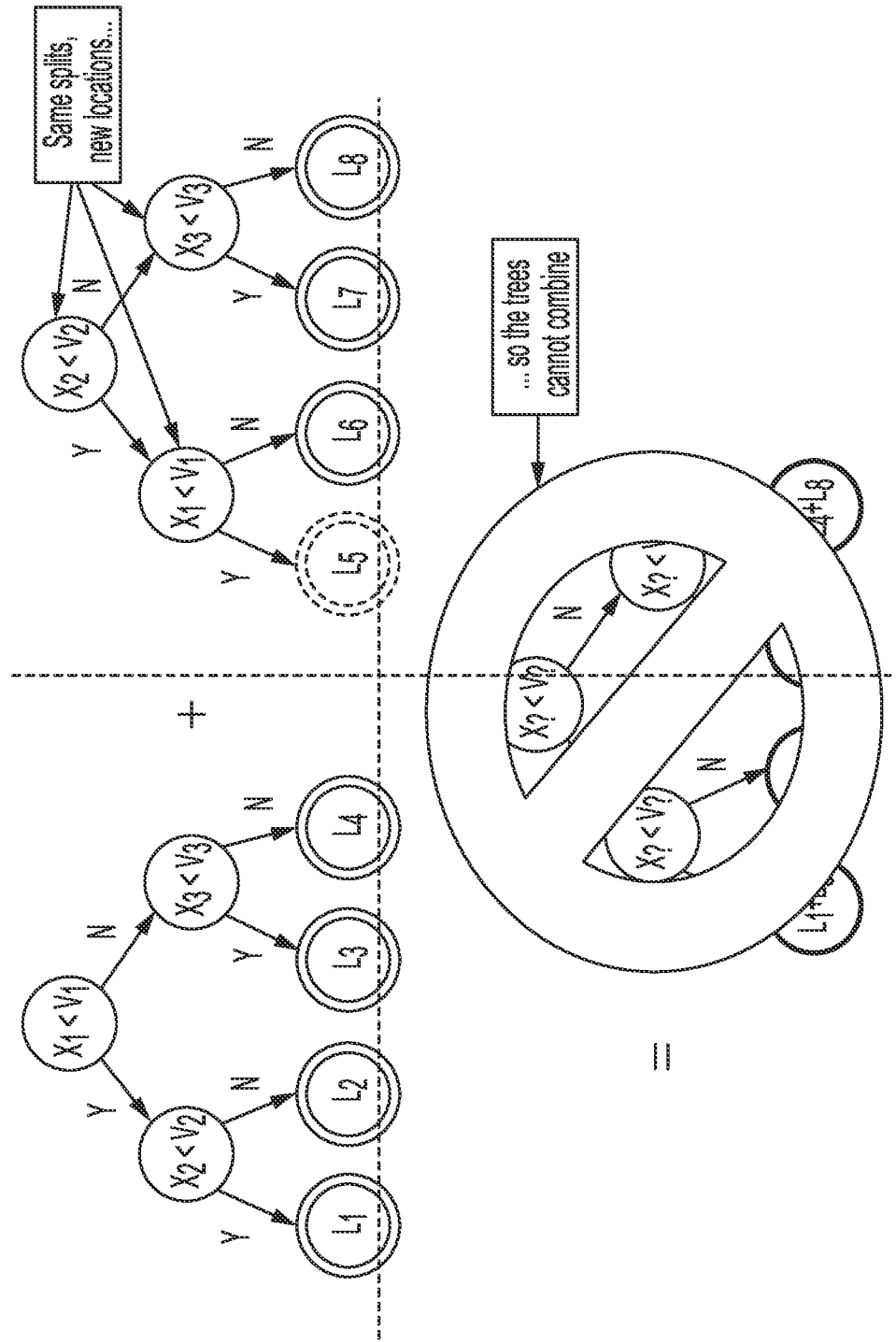
Figure 6A:
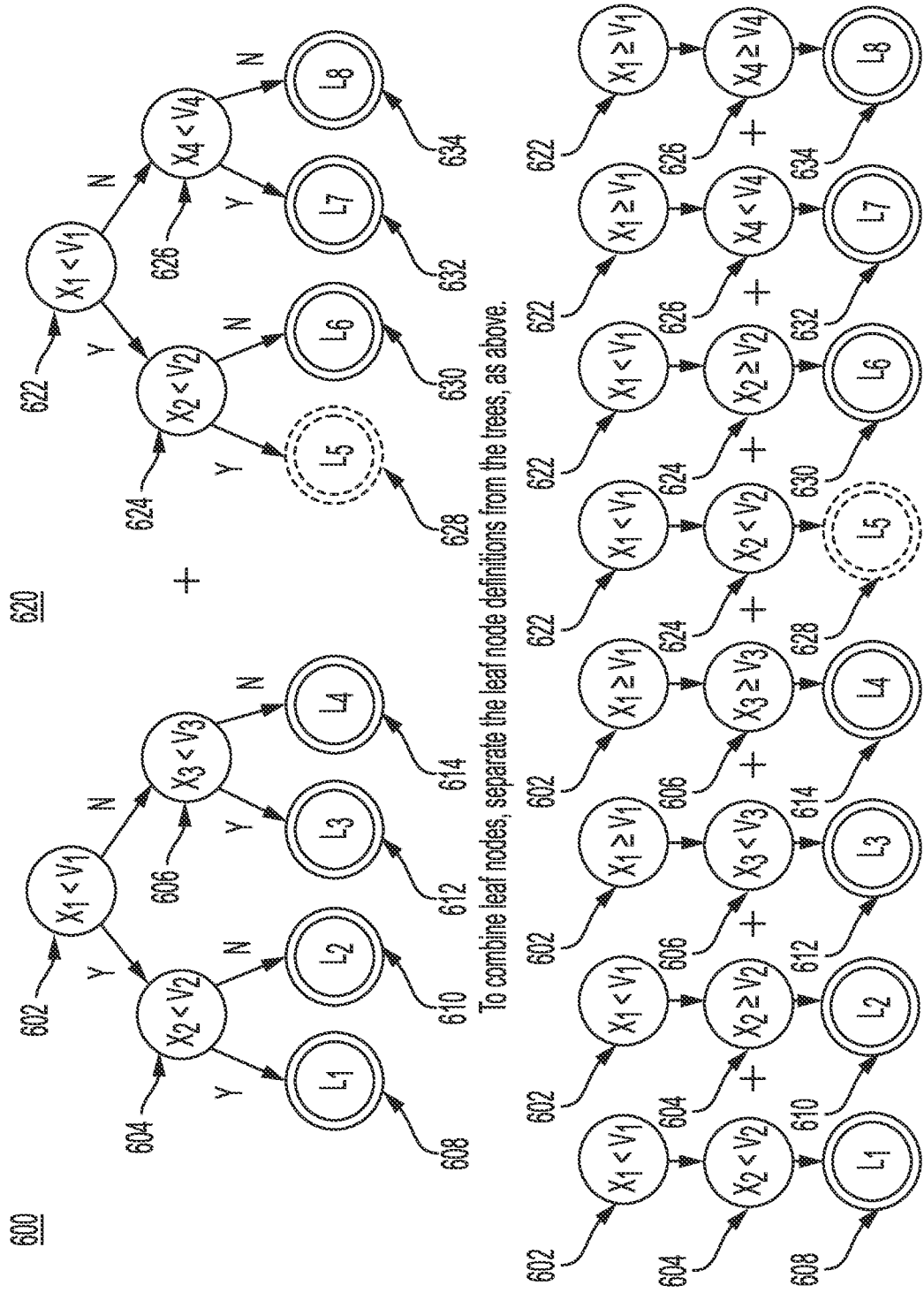
Figures 1, 6B:
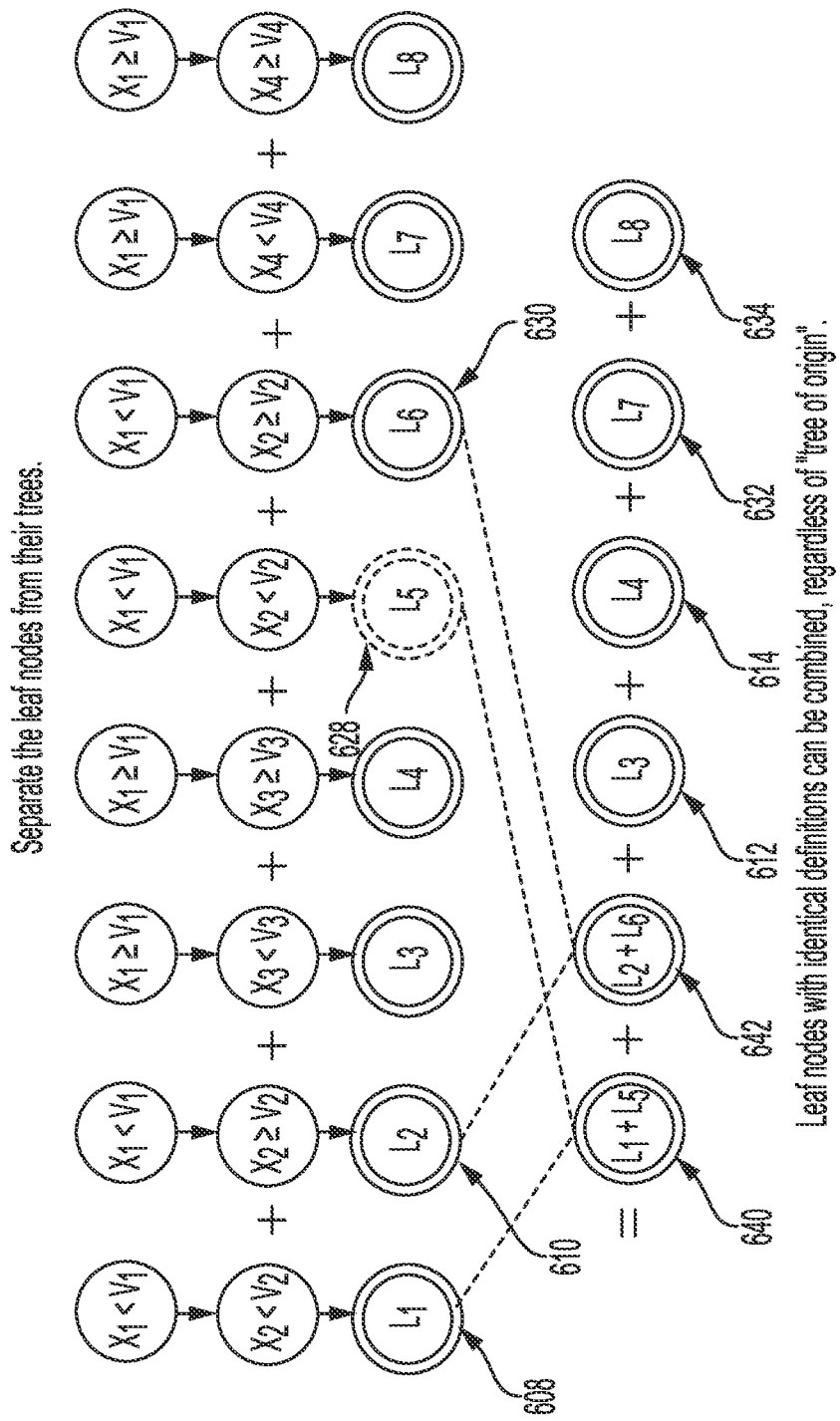
Figures 2, 6B:
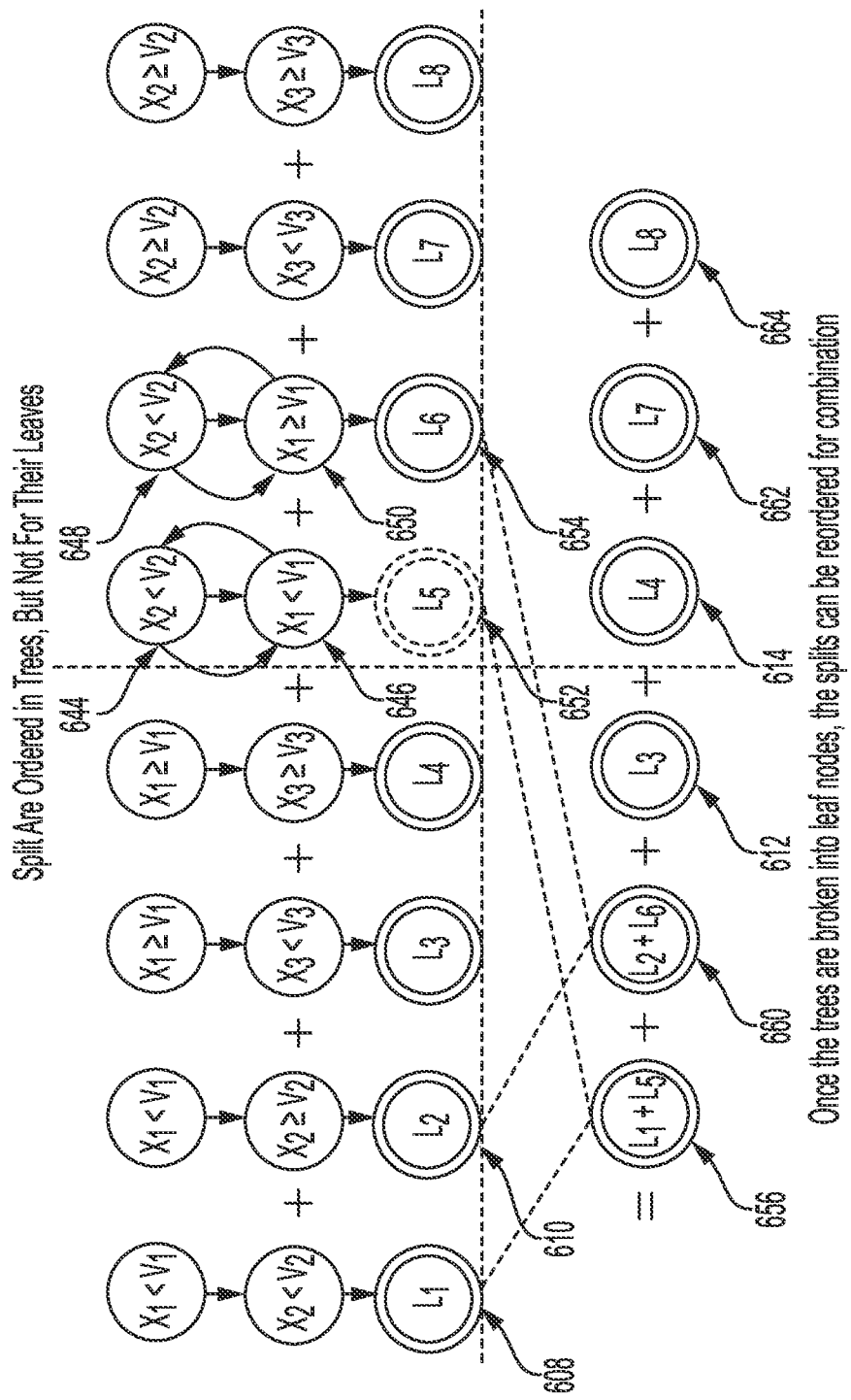
Figure 6C:
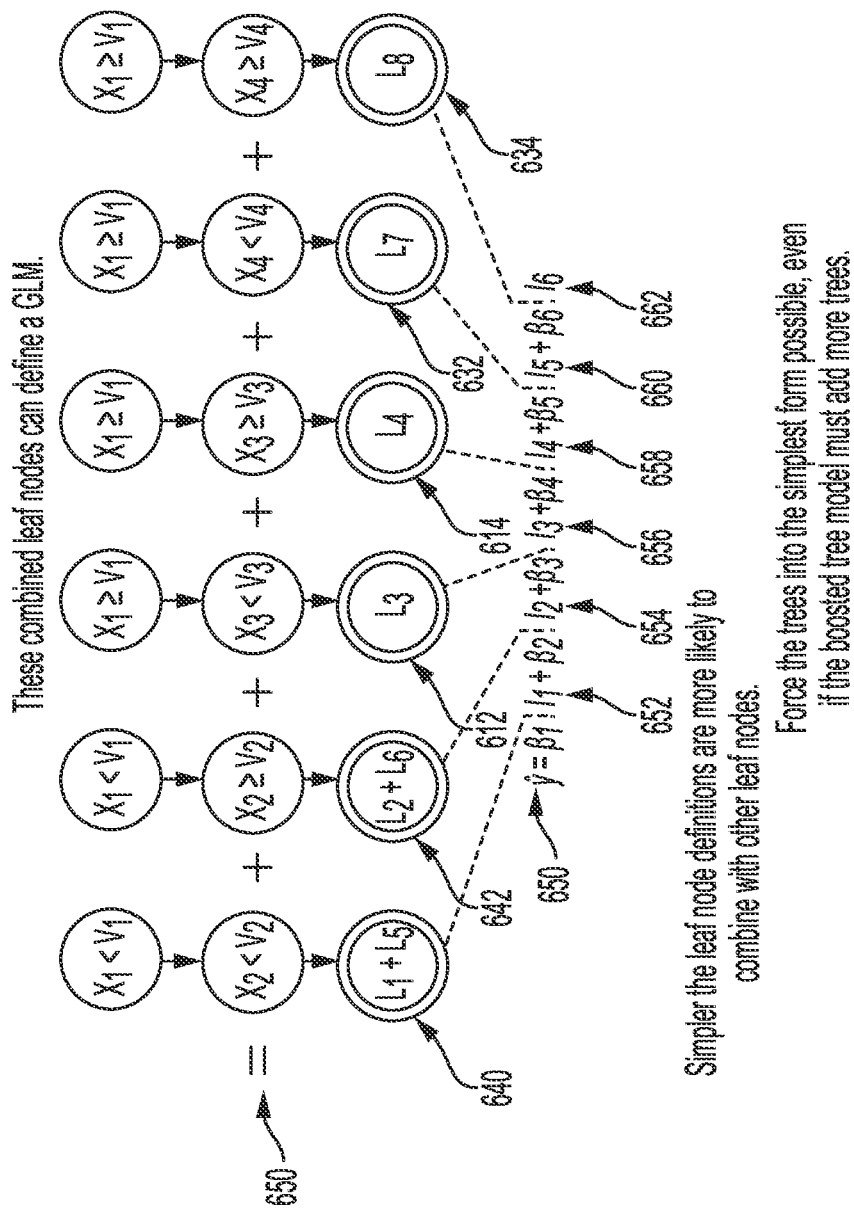
Figure 7:
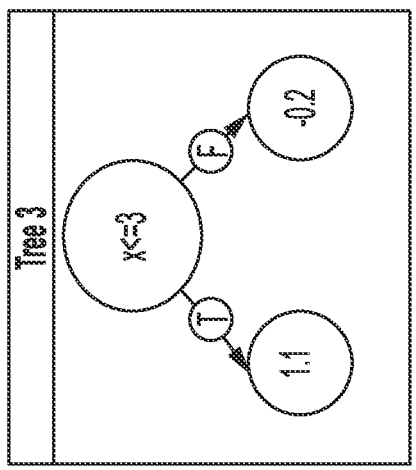
Figure 7:
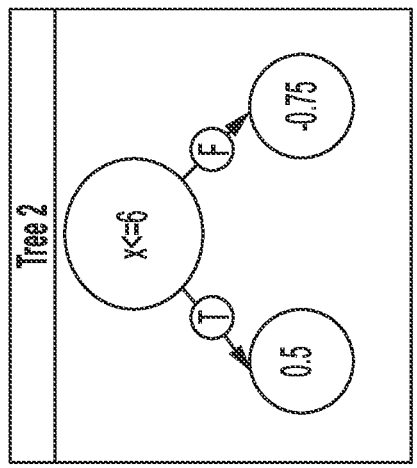
Figure 7:
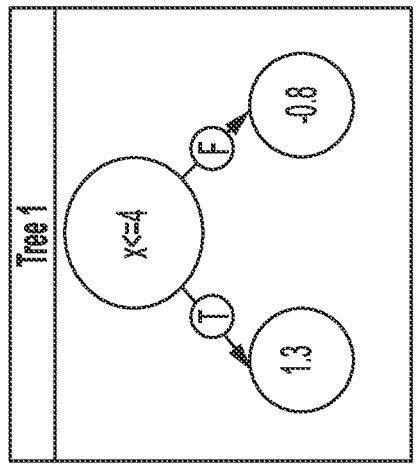
Figure 8:
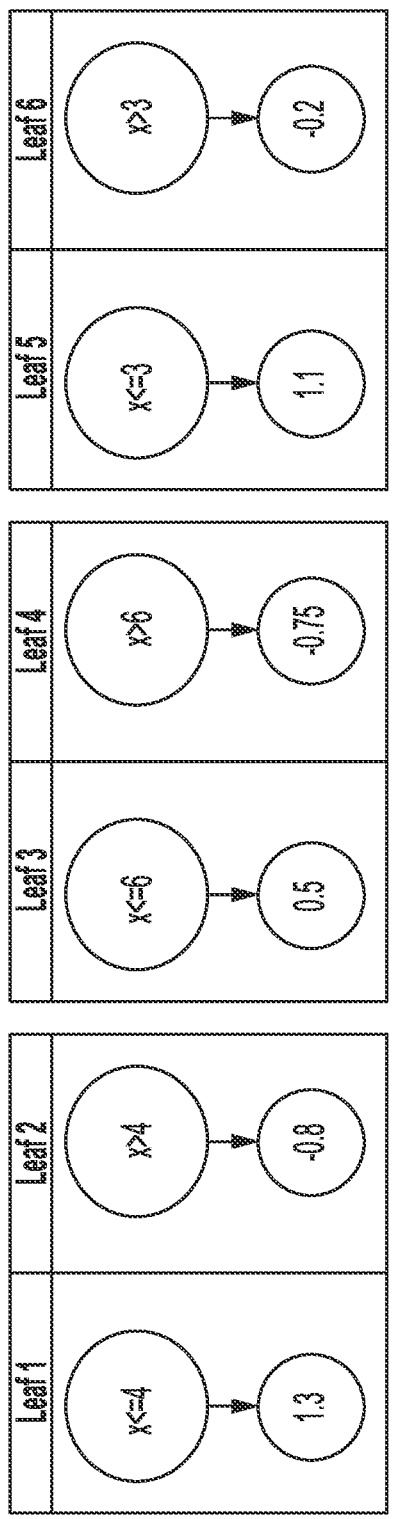
Figure 9A:
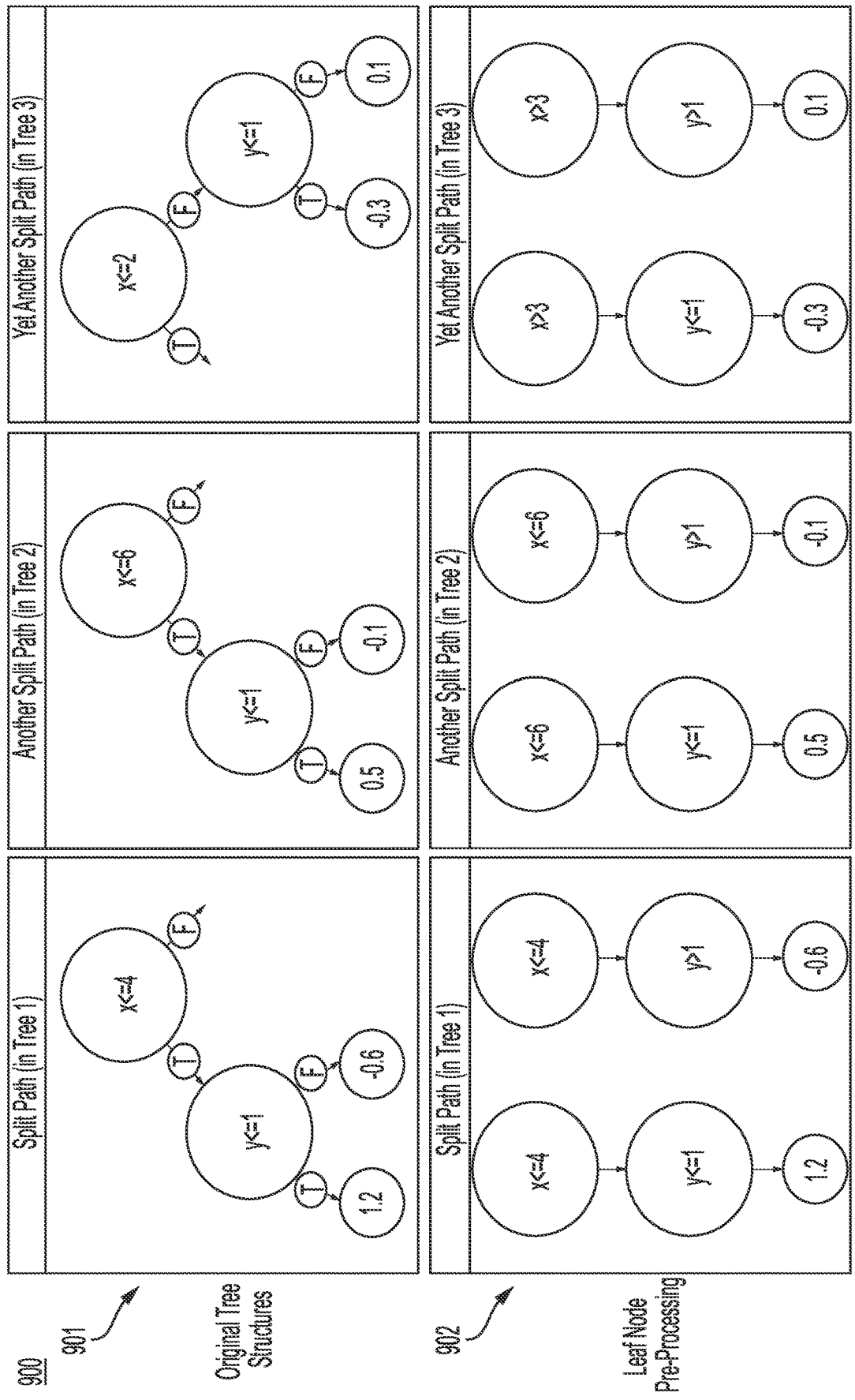
Figure 9B:
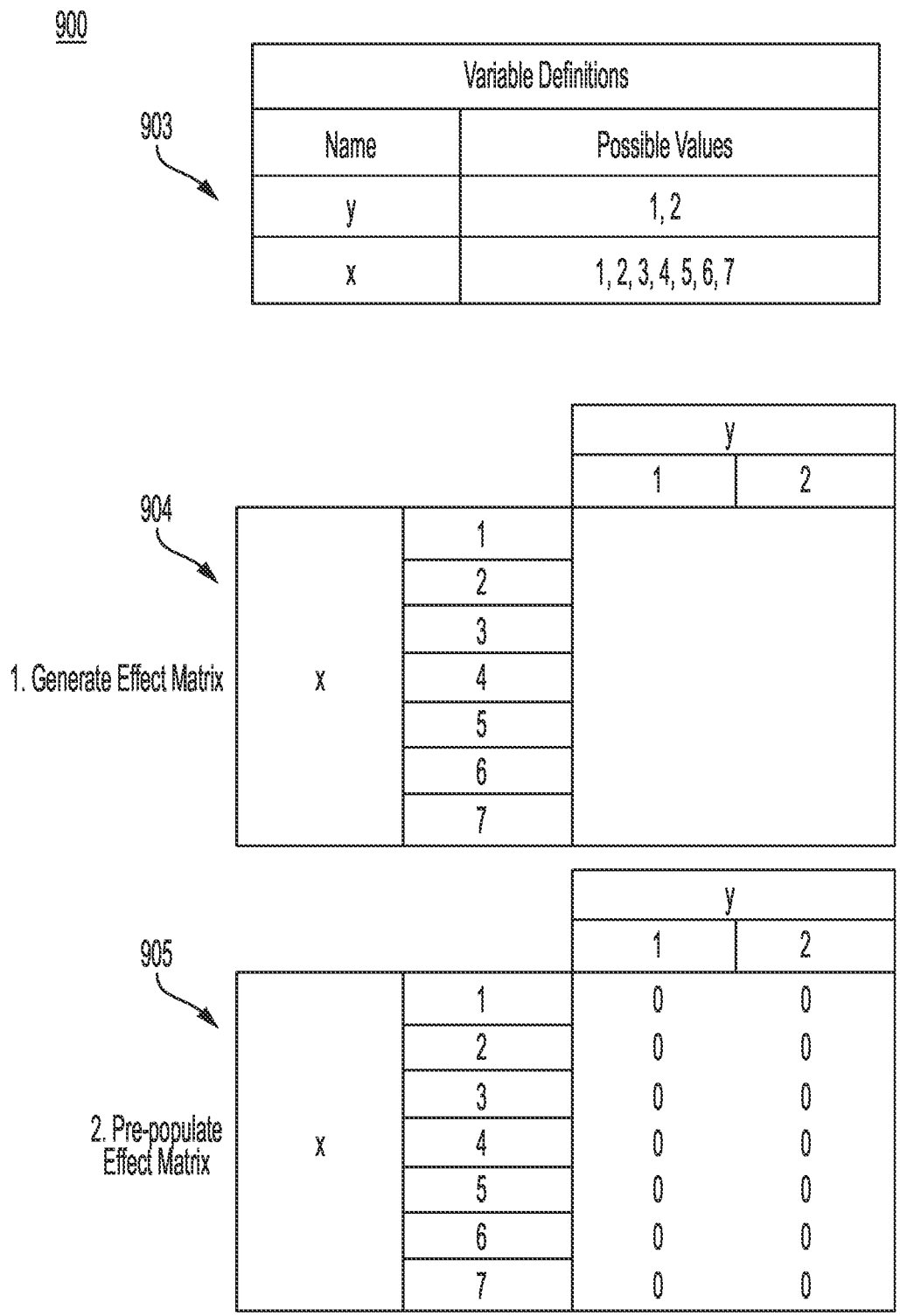
Figure 9C:
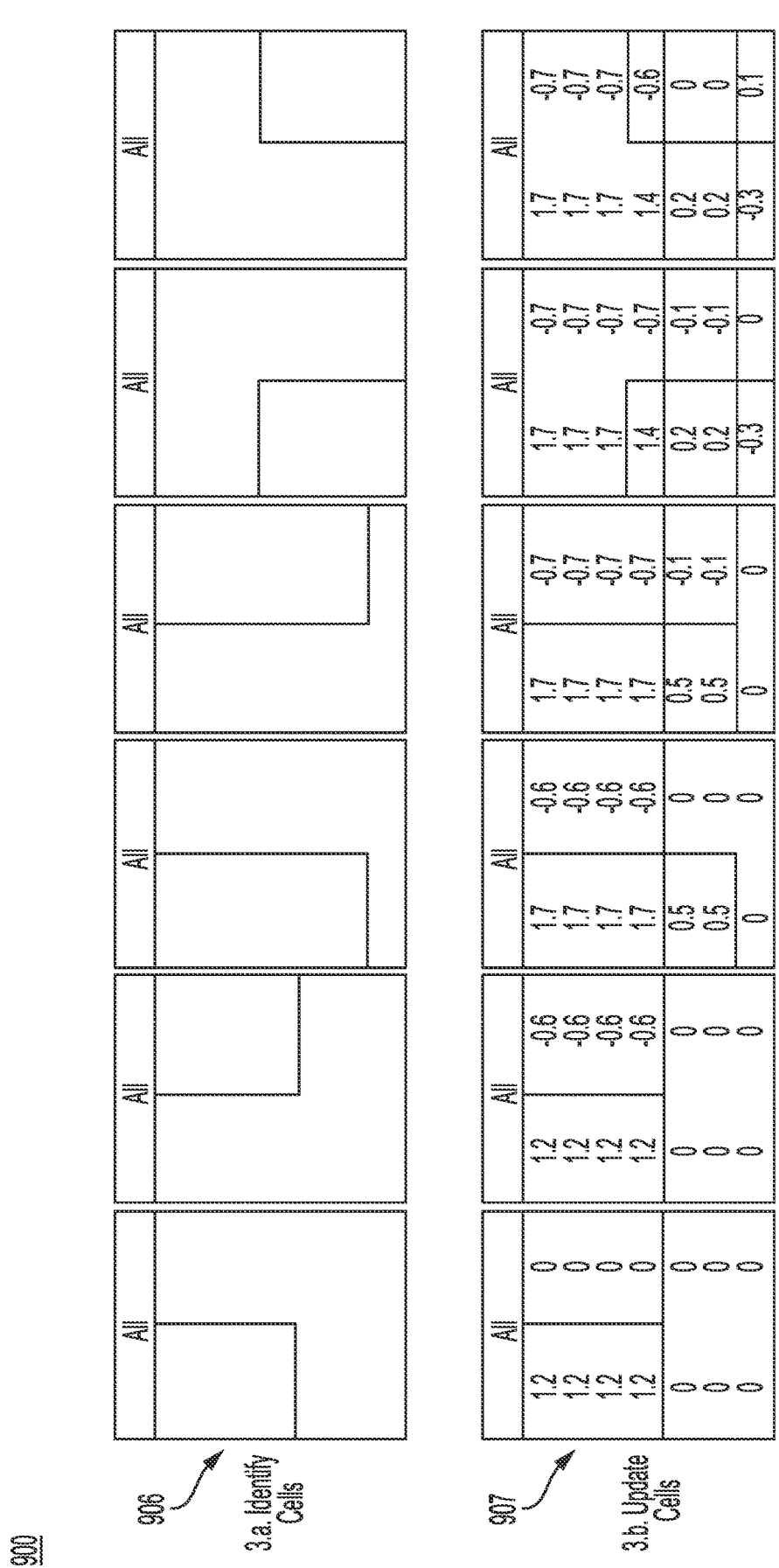
Figure 10:
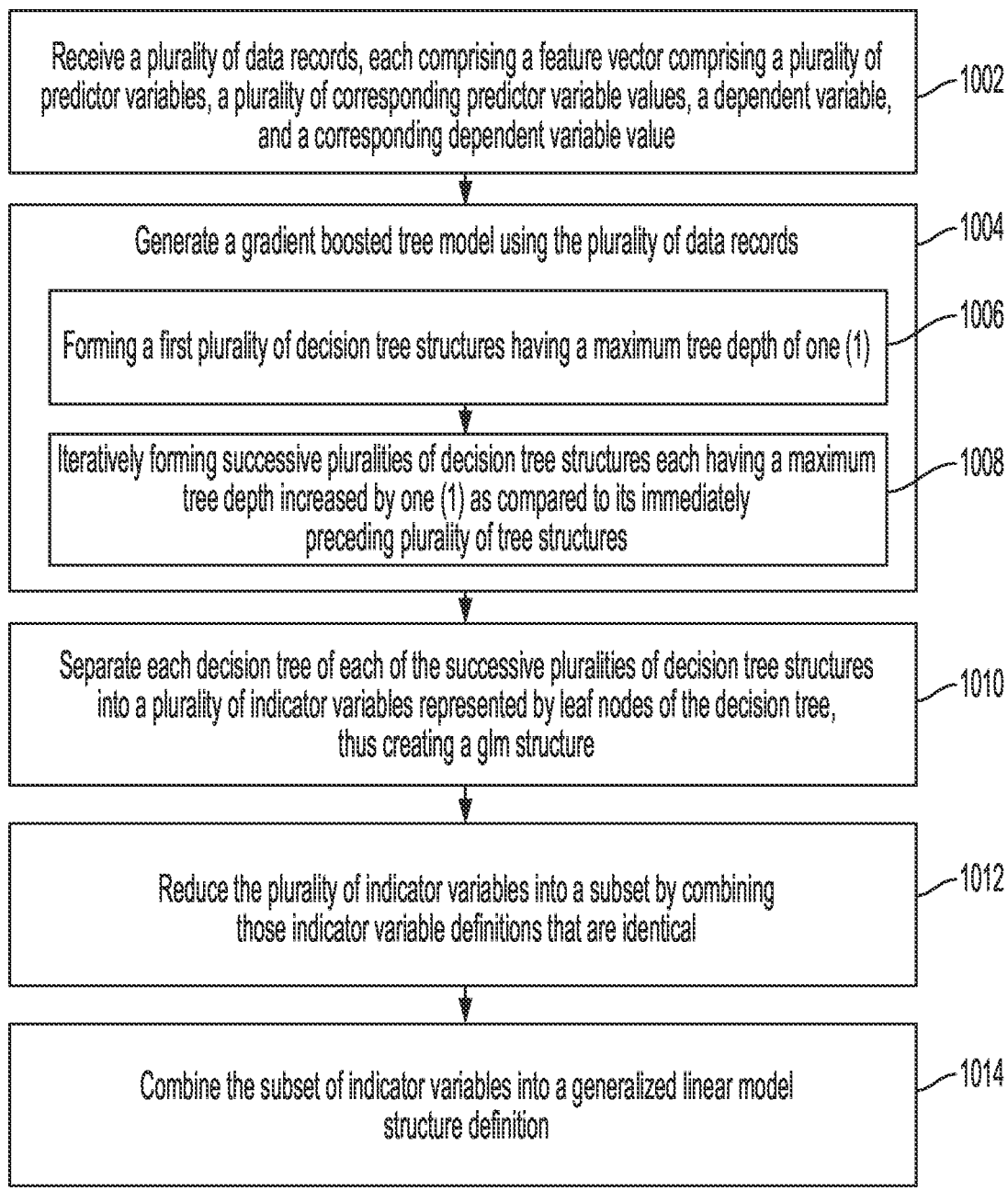

Having thus described the invention in general terms, reference will now be made to the accompanying drawings, which are not necessarily drawn to scale, and wherein:

FIG. 1 is a system architecture diagram of system configured to practice embodiments of the present disclosure;

FIG. 2 is an exemplary schematic diagram of a computing entity according to one embodiment of the present disclosure;

FIG. 3A is an exemplary illustration of components of an exemplary decision tree, according to embodiments of the present disclosure;

FIG. 3B is an exemplary illustration of a process by which a decision tree creates a prediction, according to embodiments of the present disclosure;

FIG. 3C is an exemplary illustration comparing a decision tree to a generalized linear model, according to embodiments of the present disclosure;

FIG. 3D is an exemplary illustration comparing a decision tree to a generalized linear model which fully reflects the complexity of the tree structure and leaf node definitions, according to embodiments of the present disclosure;

FIG. 4A illustrates exemplary decision tree split depths and their relation to GLM interaction complexity, for use with embodiments of the present disclosure;

FIG. 4B illustrates exemplary gradient boosted tree model training processes for use with embodiments of the present disclosure;

FIG. 4C illustrates exemplary clarity enforcing processes for use with embodiments of the present disclosure;

FIG. 5A illustrates exemplary generation of indicator variables using a decision tree model according to embodiments of the present disclosure;

FIG. 5B illustrates exemplary generation of indicator variables using a decision tree model according to embodiments of the present disclosure;

FIG. 5C illustrates exemplary generation of indicator variables using a decision tree model according to embodiments of the present disclosure;

FIG. 5D illustrates exemplary generation of indicator variables using a decision tree model according to embodiments of the present disclosure;

FIG. 5E-1 illustrates exemplary generation of indicator variables using a decision tree model according to embodiments of the present disclosure;

FIG. 5E-2 illustrates exemplary generation of indicator variables using a decision tree model according to embodiments of the present disclosure;

FIG. 5E-3 illustrates exemplary generation of indicator variables using a decision tree model according to embodiments of the present disclosure;

FIG. 5F illustrates exemplary generation of a GLM comprised of indicator variables derived from a decision tree model according to embodiments of the present disclosure;

FIG. 5G illustrates exemplary simplification of decision tree models with identical split node structure according to embodiments of the present disclosure;

FIG. 5H-1 illustrates exemplary complications in the simplification of decision tree models with nearly identical split node structure according to embodiments of the present disclosure;

FIG. 5H-2 illustrates exemplary complications in the simplification of decision tree models with nearly identical split node structure according to embodiments of the present disclosure;

FIG. 6A illustrates an exemplary combination and/or reordering of decision trees by leaf node according to embodiments of the present disclosure;

FIG. 6B-1 illustrates an exemplary combination and/or reordering of decision trees by leaf node according to embodiments of the present disclosure;

FIG. 6B-2 illustrates an exemplary combination and/or reordering of decision trees by leaf node according to embodiments of the present disclosure;

FIG. 6C illustrates an exemplary combination and/or reordering of decision trees by leaf node according to embodiments of the present disclosure;

FIG. 7 illustrates a prior art process for determining main effects of predictor variables on decision tree model outcome;

FIG. 8 illustrates an exemplary process for determining, by collection, aggregation, and summarization of related indicator variables and indicator variable parameter estimates, main effects of predictor variables on decision tree model outcome for use with embodiments of the present disclosure;

FIG. 9A illustrates an exemplary process for determining, by collection, aggregation, and summarization of related indicator variables and indicator variable parameter estimates, interactions between predictor variables within a decision tree model for use with embodiments of the present disclosure;

FIG. 9B illustrates an exemplary process for determining, by collection, aggregation, and summarization of related indicator variables and indicator variable parameter estimates, interactions between predictor variables within a decision tree model for use with embodiments of the present disclosure;

FIG. 9C illustrates an exemplary process for determining, by collection, aggregation, and summarization of related indicator variables and indicator variable parameter estimates, interactions between predictor variables within a decision tree model for use with embodiments of the present disclosure; and FIG. 10 illustrates an exemplary process for defining a generalized linear model structure definition based on (and equivalent to) a gradient boosted tree model for use with embodiments of the present disclosure.

DETAILED DESCRIPTION

Various embodiments of the present disclosure now will be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

EXEMPLARY DEFINITIONS

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the pattern recognition field, a pattern is defined by the feature xi which represents the pattern and its related value yi. For a classification problem, yi represents a class or more than one class to which the pattern belongs. For a regression problem, yi is a real value. For a classification problem, the task of a classifier is to learn from the given training dataset in which patterns with their classes are provided. The output of the classifier is a model or hypothesis h that provides the relationship between the attributes xi and the class yi. The hypothesis h is used to predict the class of a pattern depending upon the attributes of the pattern.

Neural networks, naive Bayes, decision trees, and support vector machines are popular classifiers.

In decision analysis, a decision tree can be used to visually and explicitly represent decisions and decision making. In data mining, a decision tree describes data (but the resulting classification tree is used as an input for decision making).

Decision Tree, Supervised Learning: In embodiments, a decision tree is in the form of a tree structure, where each node is either a leaf node (indicates the prediction of the model), or a split node (specifies some test to be carried out on a single attribute-value), with two branches. A decision tree can be used to make a prediction by starting at the root of the tree and moving through it until a leaf node is reached, which provides the prediction for the example.

Decision Tree Learning (Synonyms: CART—Classification And Regression Tree, Recursive Partitioning): Decision tree learning uses a decision tree (as a predictive model) to go from observations about an item (represented in the split nodes) to conclusions about the item's dependent variable (represented in the leaf nodes).

The term "classification tree" refers to a classification model created by a decision tree algorithm such as CART.

The term "regression tree" refers to a regression model created by a decision tree algorithm such as CART.

Decision Tree Learning Objective: In decision tree leaning, the goal is to create a model that predicts the value of a dependent variable based on several independent variables. Each leaf of the decision tree represents a value of the dependent variable given the values of the independent variables, represented by the path from the root to the leaf (passing through split nodes).

A Generalized Linear Model (GLM) is a statistical model which relaxes or removes several of the assumptions required by a least-squares linear regression. The flexibility thus gained makes the Generalized Linear Model (GLM) suitable for application to a larger set of data types and prediction problems. As a statistical model, a Generalized Linear Model (GLM) favors analytical rigor and clarity of interpretation over the exhaustive maximization of predictive accuracy (statistical inference over predictive accuracy). A skilled practitioner must specify which variables will contribute to the model's prediction, and the form of their relationship with the quantity to be predicted. In addition to being very labor intensive, this manual specification process tends to overlook some variables and combinations of variables which could improve the predictive accuracy of the Generalized Linear Model (GLM).

Gradient boosting is a machine learning technique for regression and classification problems which produces a prediction model in the form of an ensemble of weak prediction models, typically decision trees. It builds the model in a stage-wise fashion like other boosting methods do, and it generalizes them by allowing optimization of an arbitrary differentiable loss function. For example, gradient boosting combines weak learners into a single strong learner in an iterative fashion. Gradient boosting tends to aggressively exploit any opportunity to improve predictive accuracy, to the detriment of clarity of interpretation (or, indeed, the feasibility of any interpretation whatsoever).

The term "classifier" refers to a class or type to which data is said to belong or with which the data is said to be associated.

The term "regression model" refers to a supervised model in which the dependent variable is a numeric variable.

The term "classification model" refers to a supervised model in which the dependent variable is a categorical variable. A classification model may be referred to as a classifier.

The terms "classifier algorithm" or "classification algorithm" refer to a classifier algorithm which estimates a classification model from a set of training data. The "classifier algorithm" uses one or more classifiers and an associated algorithm to determine a probability or likelihood that a set of data belong to another set of data. A decision tree model where a target variable can take a discrete set of values is called a classification tree (i.e., and therefore can be considered a classifier or classification algorithm).

The term "numeric variable" refers to a variable whose values are real numbers. Numeric variables may also be referred to as real-valued variables or continuous variables.

The term "ordinal variable" refers to a variable whose values can be ordered, but the distance between values is not meaningful (e.g., first, second third, etc.).

The term "categorical variable" refers to a variable whose values are discrete and unordered. These values are commonly known as "classes."

The term "indicator variable" refers to a variable that is a special case of a numeric variable, in which the variable can only take the values 1 or 0. These values are commonly used to represent "True" or "False" ("boolean") values, respectively. Such truth values can provide a numeric representation of membership in a group, such as a class of a categorical variable (e.g. "This record is a member of this particular class; true or false?"), or membership in a partition of the data. In embodiments, a definition of an indicator variable is generated by methods described herein. In embodiments, an indicator variable definition refers to a set of conditions that, when satisfied, result in the indicator variable taking a value of 1. In embodiments, the set of conditions within the indicator variable definition are set based upon those split nodes through which a traversal steps until reaching a leaf node associated with the indicator variable to be defined.

The term "datum" refers to, in the context of supervised models, a pair of elements consisting of a value for a dependent variable and one or more values for the independent variable(s). Datum may also be referred to as a record, observation, instance, and example.

The term "dependent variable" refers to a variable whose value depends on the values of independent variables. The dependent variable represents the output or outcome whose variation is being studied. A dependent variable may also be referred to as a response, an output variable, or a target variable.

The terms "independent variable" or "predictor variable" refer to a variable which is used to predict the dependent variable, and whose value is not influenced by other values in the supervised model. Models and experiments described herein test or determine the effects that independent variables have on dependent variables. Supervised models and statistical experiments test or estimate the effects that independent variables have on the dependent variable. Independent variables may be included for other reasons, such as for their potential confounding effect, without a wish to test their effect directly. In embodiments, predictor variables are input variables (i.e., variables used as input for a model are referred to as predictors). In embodiments, predictor or input variables are also referred to as feature Independent variables may also be referred to as features, predictors, regressors, and input variables.

The term "control variable" refers to an independent variable which is included in a model, without intention to analyze its effect on the response variable. Such variables are included to avoid biasing, by their absence, the estimates of other effects of interest in the model. Control variables may also be referred to as nuisance variables.

The terms "supervised model" and "predictive model" refer to a supervised model, which is an estimate of a mathematical relationship in which the value of a dependent variable is calculated from the values of one or more independent variables. The functional form of the relationship is determined by the specific type (e.g. decision tree, GLM, gradient boosted trees) of supervised model. Individual numeric components of the mathematical relationship are estimated based on a set of training data. The set of functional forms and numerical estimates a specific type of supervised model can represent is called its "hypothesis space".

The term "effect" refers to an estimated impact in a supervised model of one or more independent variables on the dependent variable. An effect may be referred to as a beta or a coefficient in the context of a traditional statistical model (e.g. a GLM).

The term "main effect" refers to an effect which is determined by a single independent variable on a dependent variable-ignoring all other independent variables. That is, a main effect does not change in response to the value of other independent values.

The term "interaction effect" refers to an effect by a single independent variable on a dependent variable, taking into consideration one or more other independent variables. When a model assesses possible interactions, for example, the model assess whether the different conditions for a first independent variable produce results that differ depending on what condition is considered for a second independent variable. That is, an interaction effect is an effect in which the impact of one independent variable on the dependent variable changes based on the values of one or more other independent variables The term "split node" refers to an internal node of a decision tree representing a test for an attribute. A split node may split data into two directions (i.e., those data satisfying the condition may traverse to a particular next node, and those data not satisfying the condition may traverse to an alternative next node). The path to the next node is sometimes referred to as a branch (i.e., each branch representing the outcome of the test or condition at the split node). A first split node of a decision tree may be referred to as a root node. A root node has no incoming edges/paths and zero or more outgoing edges/paths/branches. A split node has exactly one incoming edge/branch/path and two or more outgoing edges/branches/paths.

The term "split node definition" refers to a condition or test performed at the associated split node. For example, a condition may be that a piece of data be greater than, less than, equal to, and the like, a defined numerical value.

The term "leaf node" refers to a terminal node of a decision tree. In embodiments, a leaf node represents a class of data, where the class of data is uniquely defined by the path leading to the leaf node. A leaf node has exactly one incoming edge/path/branch and no outgoing edges/paths/branches.

The term "leaf node definition" refers to a set of split node definitions associated with a traversal to a leaf node being defined. For example, if a traversal through a decision tree steps through split A and then split B before arriving at the leaf node, the leaf node is defined by the conditions contained within split A and split B, in that order. In embodiments, as explained herein, some situations result in the leaf node definition becoming reordered (i.e., the leaf node can be defined by the conditions within split B and split A, in that order).

The term "data record" refers to an electronic data value within a data structure. A data record may, in some embodiments, be an aggregate data structure (e.g., a tuple or struct). In embodiments, a data record is a value that contains other values. In embodiments, the elements of a data record are referred to as fields or members. In embodiments, data may come in records of the form: $(x, Y)=(x_1, x_2, x_3, \ldots, x_k, Y)$ where the dependent variable Y is the target variable that the model is attempting to understand/classify, or generalize. The vector x (i.e., feature vector) is composed of the features $x_1, x_2, x_3$, etc. that are used for the task.

The term "feature vector" refers to an n-dimensional vector of features that represent an object. N is a number. Many algorithms in machine learning require a numerical representation of objects, and therefore the features of the feature vector may be numerical representations.

The terms "tree depth," "decision tree depth," "maximum tree depth," "depth," and the like refer to a maximum number of queries that can occur in a decision tree before a leaf node is reached and a result obtained.

Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present disclosure may operate. Client devices may access a machine learning analytics system 115 via a communications network 102 (e.g., the Internet, LAN, WAN, or the like) using client devices 101A-101N. The machine learning analytics system 115 may comprise a server 107 in communication with one or more databases or repositories 108.

The server 107 may be embodied as a computer or computers as known in the art. The server 107 may provide for receiving of electronic data from various sources, including but not necessarily limited to the client devices 101A-101N. For example, the server 107 may be operable to receive and process routing requests provided by the client devices 101A-101N. The server 107 may facilitate the generation and training of gradient boosted trees with progressive maximum depth. The server 107 may include a generalized linear model structure definition module 103 for performing functions described herein.

The databases or repositories 108 may be embodied as a data storage device such as a Network Attached Storage (NAS) device or devices, or as a separate database server or servers. The databases 108 include information accessed and stored by the server 107 to facilitate the operations of the machine learning analytics system 115. For example, the databases 108 may include, without limitation, data representing metrics of interest to an insurance provider.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute one or more "apps" to interact with the machine learning analytics system 115. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the machine learning analytics system 115 via a web browser. As yet another example, the client device 101A-101N may include various hardware or firmware designed to interface with the machine learning analytics system 115.

The server 107 may be embodied by one or more computing systems, such as apparatus 200 shown in FIG. 2. The apparatus 200 may include a processor 202, a memory 201, input/output circuitry 204, communications circuitry 205, and generalized linear model structure definition circuitry 203. The apparatus 200 may be configured to execute the operations described herein. Although these components 201-205 are described with respect to functional limitations, it should be understood that the particular implementations necessarily include the use of particular hardware. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus should therefore be understood to include particular hardware configured to perform the functions associated with the particular circuitry as described herein. That is, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The generalized linear model structure definition circuitry 203 includes hardware configured to generate, train, analyze, and use gradient boosted decision trees with progressive maximum depth, among performing other functions described herein. The generalized linear model structure definition circuitry 203 may utilize processing circuitry, such as the processor 202, to perform these actions. It should also be appreciated that, in some embodiments, the gradient boosted decision trees circuitry 203 may include a separate processor, specially configured field programmable gate array (FPGA), or application specific interface circuit (ASIC).

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary System Operation

Embodiments of the present disclosure provide for a gradient boosted decision tree (GBM) algorithm that is forced to use data in a manner such that it produces a model that captures an improvement in prediction accuracy over a conventional generalized linear model (GLM) while allowing for inspection of the resulting algorithm output and an understanding of how the algorithm is using variables to generate its predictions. A machine learning model (e.g., a generalized linear model or generalized linear model structure) generated according to embodiments of the present disclosure enables production of indicated pricing relativities for an insurance provider. In some examples, predictions of homeowner's loss frequency and severity, as predicted by a machine learning model according to embodiments disclosed herein, experience substantially improved accuracy over those predictions generated by conventional generalized linear models (GLM).

In the context of insurance applications, interpretable machine learning (referred to hereafter as "IML") can be used to directly model insurance claim costs. The IML model produces GLM structure definition and effect estimates for the structure it defines. This provides the benefit of ML accuracy in contexts which require model interpretability.

Further, the IML is used to model the difference between an arbitrary ML model and a GLM to understand the differences. The GLM structure definition and effect estimates "export" the interpretability of an IML model to an ML model.

Moreover, IML is used to model the difference between the raw claim costs and the GLM (GLM "errors" or "residuals"). This model will try to find anything left in the data after the GLM has finished making its predictions, and expose effects which improve the GLM, but have been overlooked by other solutions. This application has been prototyped in models of homeowners claim frequency and severity (the product of which is loss cost, and forms the basis of insurance prices), and has yielded material improvement in the accuracy of these models.

In embodiments, a gradient boosted decision tree (GBM) algorithm is trained in stages, with each stage corresponding to a particular component of an equivalent generalized linear model (GLM). In embodiments, a first stage trains decision trees which capture single predictor variable components ("main effects") of the generalized linear model (GLM), and subsequent stages capture increasingly complex interactions between the predictor variables of the model. In contrast, in a traditional gradient boosted decision tree (GBM) model, it would not be possible to identify or inspect the main and interaction effects.

The present disclosure applies constraints to a gradient boosted decision tree (GBM) algorithm training process to force a resulting model into an interpretable mathematical form that approximates the structure of, and thereby allows for inspection of estimated effects in a manner identical to, a generalized linear model. As such, the present disclosure provides for a system that benefits from the increased accuracy of a machine learning model (a gradient boosted tree model) without sacrificing the ease of interpretation or implementation of a generalized linear model (GLM).

Further, the present disclosure partitions the gradient boosted decision tree model into leaf node definitions that correspond to indicator variable definitions of a generalized linear model structure definition. Indicator variables having identical definitions can be combined, thereby reducing complexity of the model and reducing computation/processing time and required resources.

FIG. 3A is an exemplary schematic diagram of components of an exemplary decision tree, according to embodiments of the present disclosure. FIG. 3B is an exemplary illustration of a process by which a decision tree creates a prediction, according to embodiments of the present disclosure.

In FIGS. 3A and 3B, a decision tree 300 comprises split nodes 301, 302, 303 and leaf nodes 304, 305, 306, and 307. In decision tree 300, each split node 301, 302, 303 splits (i.e., partitions) data based on a value of a predictor. In FIG.

3A, split node 301 partitions data based on whether a variable $x_1$ has a value less than value $v_1$, split node 302 partitions data based on whether a variable $x_2$ has a value less than value $v_2$, and split node 303 partitions data based on whether a variable $x_3$ has a value less than value $v_3$. In these examples, each of the variables can be considered a predictor.

Further in FIGS. 3A and 3B, each leaf node 304, 305, 306, and 307 identifies a partition (e.g., the partition defined by the upstream splits), in this example partitions $L_1$, $L_2$, $L_3$, and $L_4$. As in shown in FIGS. 3A and 3B, to make a prediction, a data record traverses down the decision tree through the split nodes (e.g., 301, 302, 303) based on the split variable values (e.g., $x_1$, $x_2$, $x_3$) until the record arrives at a leaf node (e.g., $L_1$, $L_2$, $L_3$, $L_4$).

FIG. 3C is an exemplary illustration comparing a decision tree to a generalized linear model, according to embodiments of the present disclosure. FIG. 3D is an exemplary illustration comparing a decision tree to a generalized linear model which fully reflects the complexity of the tree structure and leaf node definitions, according to embodiments of the present disclosure Shown in FIG. 3C, a generalized linear model can make the same partitions as the decision tree 300. In examples, decision tree 300 can be represented as a generalized linear model (GLM) 308 with indicator variables of the GLM 308 corresponding to the partitions identified in the leaf nodes of the decision tree (e.g., $L_1$, $L_2$, $L_3$, $L_4$), and defined by the combination of split nodes which lead to the leaf node, as shown in FIG. 3C. Accordingly, and as shown in FIG. 3D, the indicators (e.g., $x_{L1}$, $x_{L2}$, $x_{L3}$, $x_{L4}$) are defined by more than one variable (i.e., $x_{L1}$ is defined by $x_{1,<v1}$ and $x_{2,<v2}$, $x_{L2}$ is defined by $x_{1,<v1}$ and $x_{2,\geq v2}$, $x_{L3}$ is defined by $x_{1,\geq 1}$ and $x_{3,<v3}$, and $x_{L4}$ is defined by $x_{1,\geq 1}$ and $x_{3,<v3}$), so the indicators may represent interactions between variables. In such an example, the decision tree can be represented as a generalized linear model (GLM) of interaction effects 309, as shown in FIG. 3D.

FIG. 4A illustrates exemplary decision tree split depths and their relationship to GLM interaction complexity, for use with embodiments of the present disclosure. In embodiments, in a decision tree of maximum depth one (1), the leaf nodes represent the main effects. In embodiments, in a decision tree of a maximum depth greater than one (1), the leaf nodes can represent main effects (applied sequentially, but with independent effects) and/or interaction effects (applied sequentially, with each variable's effect dependent on the value of the other variable). This uncertainty impedes interpretation of the decision tree.

FIG. 4B illustrates exemplary gradient boosting tree model training processes for use with embodiments of the present disclosure. In embodiments, a gradient boosting tree process programmatically builds a machine learning model one decision tree at a time. A prediction, according to the machine learning model, is a sum of the predictions produced by the decision trees in the model. Each decision tree is fit to the residual of its combined predecessors, and decision trees do not change once added to the machine learning model. In such embodiments, decision trees are added until no information about the predicted quantity remains in the model residual. In other words, the decision tree structures of the machine learning model cannot explain any information about the predicted quantity left in the model residual. In embodiments, the predicted quantity is referred to as a dependent variable of the model.

FIG. 4C illustrates exemplary clarity enforcing processes for use with embodiments of the present disclosure. In embodiments, clarity is enforced according to the present disclosure by building a gradient boosted tree model with a maximum depth that is gradually increased. For example, and as shown in FIG. 4C, the gradient boosted tree model is initially built by allowing single splits. In such an example, the machine learning model will fit only main effects and exhaust any variation that can be explained by the main effects. Next, the gradient boosted tree model is built upon by allowing two consecutive splits. In such embodiments, the machine learning model could fit main effects and interaction effects, however the main effects are already contemplated by the first set of single splits. Thus, any systematic variation remaining in the response is sufficiently complex to require at least a two-way interaction to reflect it in the model. Therefore, the second layer of the gradient boosted tree model only contains two-way interaction effects, thereby providing visibility into the machine learning model and its components.

FIGS. 5A-5H-2 illustrate exemplary generation of indicator variables using a gradient boosted tree model according to embodiments of the present disclosure.

In embodiments, a decision tree 500 comprises a first split node 502, a second split node 504, a third split node 506, and four leaf nodes $L_1$ 508, $L_2$ 510, $L_3$ 512, and $L_4$ 514. In embodiments, each leaf node $L_1$ 508, $L_2$ 510, $L_3$ 512, and $L_4$ 514 can be individually defined by the split nodes leading up to it, and does not need to be tied to the decision tree 500. As an example, as shown in FIGS. 5B and 5C, leaf node $L_1$ 508 is defined only by the first split node 502 and the second split node 504. Leaf node $L_1$ 508 is preserved and "unharmed" if the rest of the decision tree (with the exception of first split node 502 and second split node 504) is discarded.

Accordingly, and as shown in FIG. 5D, decision tree 500 can be "rewritten" as a set of single leaf node definitions. For example, leaf node $L_1$ 508 is defined only by the first split node 502 and the second split node 504; leaf node $L_2$ 510 is defined only by the first split node 502 and the second split node 504; leaf node $L_3$ 512 is defined only by the first split node 502 and the third split node 506; and leaf node $L_4$ 514 is defined only by the first split node 502 and the third split node 506.

Shown in FIG. 5E-1, each leaf node definition can define an indicator variable of a generalized linear model (GLM). The leaf node contains the prediction of the tree model for records assigned to the leaf node by splits in the tree. The parameter β, shown in FIG. 5E-1, for an indicator variable in a GLM functions identically. Therefore, the leaf definition and leaf node provide both the GLM structure and GLM estimate (e.g., B).

With continued reference to FIG. 5E-1, if a record would have ended up in a particular leaf node ($L_1$ in this example), then the indicator variable has a value of 1. Otherwise, the variable has the value 0. Indicator variables such as $I_1$ are how GLMs reflect the value of non-numeric data. It will be appreciated that binary "yes or no" questions require a single indicator variable. More complicated non-numeric values (such as vehicle make, or the leaf nodes of a decision tree) require more indicator variables to capture each of the possible values.

For the tree in the example shown in FIG. 5E-1, an equivalent GLM would have four indicator variables, reflecting which of the four leaf nodes apply to a particular record in the data (shown in FIGS. 5E-1 and 5E-2). By virtue of being derived from the same tree, a record will have a value of 1 in exactly one of the indicator variables. Thus there is no danger of "double counting" by adding together two leaf nodes from a single tree. Since membership in a leaf node is mutually exclusive with all other leaf nodes from that tree, only a single leaf node's prediction will ever apply. However, the GLM has no concept of the original "tree"; it only knows whether or not a record has a 1 or 0 for each of our leaf node indicator variables.

Shown in FIG. 5E-2, each leaf node definition can define an indicator variable of a generalized linear model (GLM) 530. For example, leaf node $L_1$ 508, defined by the first split node 502 and the second split node 504, defines an indicator variable $I_1$ 516; leaf node $L_2$ 510, defined by the first split node 502 and the second split node 504, defines an indicator variable $I_2$ 518; leaf node $L_3$ 512, defined by the first split node 502 and the third split node 506, defines an indicator variable $I_3$ 520; and leaf node $L_4$ 514, defined by the first split node 502 and the third split node 506, defines an indicator variable $I_4$ 522. It will be appreciated that each indicator variable $I_i$ is defined as I if the splits of the split nodes leading up to the corresponding leaf node are all satisfied, and 0 otherwise.

Shown in FIG. 5E-3, similar to FIG. 5E-2, each leaf node definition can define an indicator variable of a generalized linear model 530. For example, leaf node $L_1$ 508, defined by the first split node 502 and the second split node 504, defines an indicator variable $I_1$ 516. Illustrated in FIG. 5E-3 is the fact that the order of the split nodes 502, 504 does not impact the leaf node definition 508 and therefore does not impact the indicator variable definition 516. For example, if a traversal went from split node 502 to split node 504 to arrive at leaf node 508, the indicator variable definition 516 is the same as if a traversal went from split node 504 to split node 502 to arrive at leaf node 508.

Shown in FIG. 5F, the indicator variables $I_1$, $I_2$, $I_3$, and $I_4$ are each defined by multiple variables (shown in the split nodes of each indicator variable definition). In such a case, the indicator variables may represent interactions of the split variables (e.g., $v_1$, $v_2$, $v_3$). Therefore, decision tree 500 has become represented as a GLM 530 of interaction effects, including $I_1$ 516, $I_2$ 518, $I_3$ 520, and $I_4$ 522.

Shown in FIG. 5G, identical split nodes across multiple trees within a boosted tree model enables combining of those trees having common split nodes. For example, decision tree 540 and decision tree 550 have identical first 542, second 544, and third 546 split nodes. Because each of decision tree 540 and decision tree 550 have identical first 542, second 544, and third 546 split nodes, they can be combined into decision tree 580. Decision tree 580 comprises a first split node 542, a second split node 544, and a third split node 546. Decision tree 580 further comprises a combination ($L_1+L_5$ or 560+570) of leaf nodes $L_1$ 560 and $L_5$ 570 from decision trees 540 and 550, respectively. Decision tree 580 further comprises a combination ($L_2+L_6$ or 562+572) of leaf nodes $L_2$ 562 and $L_6$ 572 from decision trees 540 and 550, respectively. Decision tree 580 further comprises a combination ($L_3+L_7$ or 564+574) of leaf nodes $L_3$ 564 and $L_7$ 574 from decision trees 540 and 550, respectively. Decision tree 580 further comprises a combination ($L_4+L_8$ or 566+576) of leaf nodes $L_4$ 566 and $L_8$ 576 from decision trees 540 and 550, respectively.

Shown in FIG. 5H-1, entire decision trees are seldom identical as a whole, so they cannot be combined, and thus no benefit can be gained from combination and simplification.

Shown in FIG. 5H-2, with reference to the feature highlighted in FIG. 5E-2, entire decision trees are seldom identical as a whole, so they cannot be combined. Thus, no benefit can be gained by combination, simplification, and reordering of splits.

FIGS. 6A, 6B-1, 6B-2, and 6C illustrate an exemplary combination of decision trees by leaf node according to embodiments of the present disclosure. Shown in FIG. 6A, decision trees 600 and 620 are not identical, although they may share some leaf node definitions.

Also shown in FIG. 6A, decision tree 600 is separated into each of its leaf node definitions. For example, leaf node $L_1$ 608 of decision tree 600 is defined by split node 602 and split node 604; leaf node $L_2$ 610 of decision tree 600 is defined by split node 602 and split node 604; leaf node $L_3$ 612 of decision tree 600 is defined by split node 602 and split node 606; and leaf node $L_4$ 614 of decision tree 600 is defined by split node 602 and split node 606. Decision tree 620 is similarly separated into each of its leaf node definitions. For example, leaf node $L_5$ 628 of decision tree 620 is defined by split node 622 and split node 624; leaf node $L_6$ 630 of decision tree 620 is defined by split node 622 and split node 624; leaf node $L_7$ 632 of decision tree 620 is defined by split node 622 and split node 626; and leaf node $L_8$ 634 of decision tree 620 is defined by split node 622 and split node 626.

Accordingly, shown in FIG. 6B-1, the leaf nodes can be separated from the decision trees 600, 620, and those leaf nodes with identical definitions can be combined regardless of whether they originated from decision tree 600 or 620. For example, leaf node $L_1$ 608 and leaf node $L_5$ 628 have the same definition (illustrated by the split decisions within their respective associated split nodes) and can be combined ($L_1+L_5$) into a leaf node 640. Also, leaf node $L_2$ 610 and leaf node $L_6$ 630 have the same definition (illustrated by the split decisions within their respective associated split nodes) and can be combined ($L_2+L_6$) into a leaf node 642. The remaining leaf nodes, $L_3$ 612, $L_4$ 614, $L_7$ 632, and La 634 remain the same because they do not share definitions with any other leaf nodes.

As discussed above, a traversal of split nodes can be reordered as necessary to facilitate simplification (a benefit only afforded because the present disclosure liberates leaf nodes from the oppressive context of their source trees). Shown in FIG. 6B-2, leaf nodes can be separated from decision trees, and those leaf nodes with identical definitions can be combined regardless of a decision tree from which they originated. Further, those leaf nodes having identical split decisions, regardless of an ordering of the split decisions, can have their definitions reordered to aid in combination and simplification. For example, leaf node $L_1$ 608 and leaf node $L_5$ 652 have the same definition (illustrated by the split decisions within their respective associated split nodes) if those split decisions 644 and 646 leading to leaf node $L_5$ 652 are reordered. Then, leaf $L_1$ 608 and leaf node $L_5$ 652 can be combined ($L_1+L_5$) into a leaf node 656. Also, leaf node $L_2$ 610 and leaf node $L_6$ 654 have the same definition (illustrated by the split decisions within their respective associated split nodes) if those split decisions 648 and 650 leading to leaf node $L_6$ 654 are reordered. Then, leaf $L_2$ 610 and leaf node $L_6$ 654 can be combined ($L_2+L_6$) into a leaf node 660. The remaining leaf nodes, $L_3$ 612, $L_4$ 614, $L_7$ 662, and La 664 remain the same because they do not share definitions with any other leaf nodes.

Shown in FIG. 6C, each leaf node definition can therefore define an indicator variable of a generalized linear model (GLM) 650. For example, leaf node 640, defines an indicator variable $I_1$ 652; leaf node 642 defines an indicator variable $I_2$ 654; leaf node $L_3$ 612 defines an indicator variable $I_3$ 656;

leaf node $L_4$ 614 defines an indicator variable $I_4$ 658; leaf node $L_7$ 632 defines an indicator variable $I_5$ 660; and leaf node $L_8$ 634 defines an indicator variable $I_6$ 662.

Once the component trees of a gradient boosted tree model have been decomposed into their leaf nodes, and the leaf nodes which have identical leaf node definitions have been aggregated, it is advantageous to collect and summarize leaf nodes which are defined by the same independent variables, but not necessarily by the same split points for those variables. An effect may be (and often is) defined by a plurality of indicator variables. For example, if an independent variable has n distinct possible values, and the model estimates a different predicted effect for each of those n distinct values, then n−1 indicator variables will be necessary to represent the main effect of this independent variable. For interactions, the potential complexity is even greater. The GLM structure definition and effect estimates may produce an equation with many thousands of individual indicator variables. In the absence of some process for the collection and aggregation of the indicator variables associated with an effect, these components may be scattered throughout the GLM equation. An effect could easily be obfuscated by the mass of arbitrarily ordered indicator variables.

In embodiments, an exemplary format (though certainly not the only one) for representing such collected and aggregated effects is a matrix. Such matrix outputs are useful for communication of results, as they allow for inspection of the entirety of an effect at a glance, and in a single concise representation (relative to scattered and disjoint indicator variables and leaf node estimates). This matrix format is also necessary for insurance pricing applications which are table-driven. For example, an exemplary IT implementation of insurance pricing algorithms may utilize such matrix format, and the format in which GLM-based relativities must be delivered for implementation utilizes such matrix format.

FIG. 7 illustrates a prior art process 700 for determining main effects of predictor variables on decision tree model outcome. In prior art processes such as that depicted in 700, main effects are incorporated one decision tree at a time, and those main effects are kept separate unless the decision trees are identical (as discussed with respect to FIG. 5H above). As shown in FIG. 7, each decision tree is transformed into a unique/separate matrix based upon an input data set, and each matrix of predictions (or values at leaf nodes) is summed or aggregated. As such, the main effects are kept separate (i.e., in the unique matrices).

FIG. 8 illustrates an exemplary process 800 for determining main effects of predictor variables on decision tree model outcome for use with embodiments of the present disclosure. In process 800, the main effects from the trees in FIG. 7 are incorporated one leaf node at a time, and the effects are combined where possible (as depicted in FIGS. 6A-6C above). In FIG. 8, though the leaf nodes are defined by different split values, they all split on the same variable, x. A matrix is created for the possible values of x, and pre-populated with zeros. The split node which defines leaf one is used to identify the cells of the matrix to which leaf 1 applies. Then, the prediction from leaf node 1 is added to the current contents of the cells thus identified (currently zeros). The subsequent leaf nodes are incorporated into the matrix in the same manner; the split node identifies the impacted cells of the matrix, and then the values in those cells of the matrix are updated by adding the prediction of the leaf node to the values to the current values in the cells. This results in a single matrix which incorporates the information contained in all of the leaf nodes (equivalently, indicator variable parameter estimates) which are defined only by split on the variable x, which appear through the model. As such, the main effects are incorporated and observed at each leaf node. Exemplary main effects in FIG. 8 are shown by way of a heat map, where the darker matrix rows represent a higher degree of effect.

FIGS. 9A-9C illustrate an exemplary process 900 for determining interactions between predictor variables within a decision tree model 901 for use with embodiments of the present disclosure.

In a step 904, a matrix is generated (more generally, a multidimensional array is generated) with a dimension for each independent variable which appears in a leaf node definition, according to variable definitions 903.

In a step 905, the matrix is populated with zeros (or other numerical value which reflects a neutral or absent value in a GLM).

In steps 906 and 907, for each indicator variable, cells of the matrix are identified (906) which fulfill the conditions of the split nodes in the leaf node definition. Subsequently, the values in the identified cells are updated (e.g., added) with the estimated values in the leaf node (see 902).

Exemplary interaction effects in FIG. 9C are shown by way of a heat map, where the darker matrix rows represent a higher degree of effect.

FIG. 10 illustrates an exemplary process for defining a generalized linear model structure definition for use with embodiments of the present disclosure.

In embodiments, a process 1000 begins with receiving a plurality of data records. In embodiments (operation 1002), each data record of the plurality of records comprises a feature vector comprising a plurality of predictor variables, a plurality of corresponding predictor variable values, a dependent variable, and a corresponding dependent variable value.

In embodiments, process 1000 continues with generating a gradient boosted tree model using the plurality of data records (operation 1004).

In embodiments, generating the gradient boosted tree model comprises forming a first plurality of decision tree structures each having a maximum tree depth of one (1) (operation 1006). In embodiments, each decision tree structure comprises a split node and a pair of leaf nodes. In embodiments, the first plurality of decision tree structures comprises a first number of decision tree structures necessary to exhaust all main effects of the plurality of predictor variables on a dependent variable of the generalized linear model structure definition.

In embodiments, generating the gradient boosted tree model further comprises iteratively forming successive pluralities of decision tree structures each having a maximum tree depth increased by one (1) as compared to its immediately preceding plurality of decision tree structures (operation 1008). In embodiments, each successive plurality of decision tree structures comprises a number of decision tree structures necessary to exhaust all interactions (involving a number of predictor variables equal to the maximum depth of the current plurality of decision trees) between the plurality of predictor variables.

In embodiments, process 1000 continues with separating each decision tree of each of the successive pluralities of decision tree structures into a plurality of indicator variables represented by the leaf nodes of the decision tree (operation 1010), thus creating a generalized linear model (GLM) structure. In embodiments, the indicator variables are defined by a series of split decisions leading up to each leaf node.

In embodiments, process 1000 continues with reducing the plurality of indicator variables into a subset of the plurality of indicator variables by combining those indicator variable definitions that are identical (operation 1012).

In embodiments, process 1000 continues with combining the indicator variables of the subset of the plurality of indicator variables into a generalized linear model structure definition upon which the dependent variable depends (operation 1014).

Details regarding various embodiments are described in the attached appendices, the contents of which are hereby herein incorporated by reference in their entirety.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus, comprising at least one processor and at least one non-transitory computer readable storage medium storing instructions that, when executed by the at least one processor, cause the apparatus to:
   generate a gradient boosted tree model based at least in part on a plurality of data records, by:
   generating a first decision tree structure having a maximum tree depth of one (1);
   iteratively generating a first layer comprising a first plurality of decision tree structures each having a maximum tree depth of one (1) until variation associated with one or more first order effects of a dependent variable in a residual of the gradient boosted tree model is exhausted, wherein each of the one or more first order effects comprises a main effect of a given predictor variable of a plurality of predictor variables on the dependent variable while ignoring all other predictor variables of the plurality of predictor variables; and
   until no information about the dependent variable remains in the residual, iteratively generating successive layers each comprising successive pluralities of decision tree structures each having a maximum tree depth n increased by one (1) as compared to its immediately preceding successive layer, wherein n is initially two (2), wherein each successive layer comprises a number of decision tree structures necessary to exhaust all variation associated with one or more nth order effects of the dependent variable in the residual, and wherein no additional successive layer is generated once all variation associated with the one or more nth order effects of the dependent variable in the residual is exhausted; and
   generate, based at least in part on the gradient boosted tree model and for a requesting computing device, one or more of one or more predictions or one or more proposed effects.

2. The apparatus of claim 1, wherein each decision tree structure of the first plurality of decision tree structures comprises a split node and a pair of leaf nodes.

3. The apparatus of claim 1, wherein each decision tree structure of the successive layers comprises up to $2^n-1$ split nodes and $2^n$ leaf nodes.

4. The apparatus of claim 3, wherein each of the one or more nth order effects comprises an nth order interaction effect of a given n predictor variables of the plurality of predictor variables on the dependent variable while ignoring all other predictor variables of the plurality of predictor variables.

5. The apparatus of claim 4, wherein the nth order interaction effect on the dependent variable is determined based at least in part on the given n predictor variables.

6. The apparatus of claim 1, wherein the at least one non-transitory computer readable storage medium stores instructions that, when executed by the at least one processor, further cause the apparatus to:

generate, based at least in part on the gradient boosted tree model, a linear model structure definition upon which the dependent variable depends.

7. The apparatus of claim 6, wherein the at least one non-transitory computer readable storage medium stores instructions that, when executed by the at least one processor, further cause the apparatus to:
generate the one or more predictions by generating one or more of a prediction of loss frequency or a prediction of loss severity based at least in part on the linear model structure definition.

8. The apparatus of claim 6, wherein the linear model structure definition enables one or more of transparent inspection or interpretation of one or more of one or more main effects or one or more interaction effects for each predictor variable on the dependent variable.

9. The apparatus of claim 1, wherein the at least one non-transitory computer readable storage medium stores instructions that, when executed by the at least one processor, further cause the apparatus to:
generate, based at least in part on the gradient boosted tree model, one or more proposed effects; and
incorporate one or more of the one or more proposed effects into one or more models, wherein the one or more models are separate from the gradient boosted tree model.

10. A computer-implemented method, comprising:
generating, using processing circuitry, a gradient boosted tree model based at least in part on a plurality of data records, by:
generating a first decision tree structure having a maximum tree depth of one (1);
iteratively generating a first layer comprising a first plurality of decision tree structures each having a maximum tree depth of one (1) until variation associated with one or more first order effects of a dependent variable in a residual of the gradient boosted tree model is exhausted, wherein each of the one or more first order effects comprises a main effect of a given predictor variable of a plurality of predictor variables on the dependent variable while ignoring all other predictor variables of the plurality of predictor variables; and
until no information about the dependent variable remains in the residual, iteratively generating successive layers each comprising successive pluralities of decision tree structures each having a maximum tree depth n increased by one (1) as compared to its immediately preceding successive layer, wherein n is initially two (2), wherein each successive layer comprises a number of decision tree structures necessary to exhaust all variation associated with one or more nth order effects of the dependent variable in the residual, and wherein no additional successive layer is generated once all variation associated with the one or more nth order effects of the dependent variable in the residual is exhausted; and
generating, using the processing circuitry, based at least in part on the gradient boosted tree model and for a requesting computing device, one or more of one or more predictions or one or more proposed effects.

11. The computer-implemented method of claim 10, wherein each decision tree structure of the first plurality of decision tree structures comprises a split node and a pair of leaf nodes.

12. The computer-implemented method of claim 10, wherein each decision tree structure of the successive layers comprises up to $2^n-1$ split nodes and $2^n$ leaf nodes.

13. The computer-implemented method of claim 12, wherein each of the one or more nth order effects comprises an nth order interaction effect of a given n predictor variables of the plurality of predictor variables on the dependent variable while ignoring all other predictor variables of the plurality of predictor variables.

14. The computer-implemented method of claim 13, wherein the nth order interaction effect on the dependent variable is determined based at least in part on the given n predictor variables.

15. The computer-implemented method of claim 10, further comprising:
generating, based at least in part on the gradient boosted tree model, a linear model structure definition upon which the dependent variable depends.

16. The computer-implemented method of claim 15, further comprising:
generating the one or more predictions by generating one or more of a prediction of loss frequency or a prediction of loss severity based at least in part on the linear model structure definition.

17. The computer-implemented method of claim 15, wherein the linear model structure definition enables one or more of transparent inspection or interpretation of one or more of one or more main effects or one or more interaction effects for each predictor variable on the dependent variable.

18. The computer-implemented method of claim 10, further comprising:
generating, based at least in part on the gradient boosted tree model, one or more proposed effects; and
incorporating one or more of the one or more proposed effects into one or more models, wherein the one or more models are separate from the gradient boosted tree model.

19. A non-transitory computer-readable storage medium storing instructions that, when executed by at least one processor of an apparatus, cause the apparatus to:
generate a gradient boosted tree model based at least in part on a plurality of data records, by:
generating a first decision tree structure having a maximum tree depth of one (1);
iteratively generating a first layer comprising a first plurality of decision tree structures each having a maximum tree depth of one (1) until variation associated with one or more first order effects of a dependent variable in a residual of the gradient boosted tree model is exhausted, wherein each of the one or more first order effects comprises a main effect of a given predictor variable of a plurality of predictor variables on the dependent variable while ignoring all other predictor variables of the plurality of predictor variables; and
until no information about the dependent variable remains in the residual, iteratively generating successive layers each comprising successive pluralities of decision tree structures each having a maximum tree depth n increased by one (1) as compared to its immediately preceding successive layer, wherein n is initially two (2), wherein each successive layer comprises a number of decision tree structures necessary to exhaust all variation associated with one or more nth order effects of the dependent variable in the residual, and wherein no additional successive layer is generated once all variation associated with the one or more nth order effects of the dependent variable in the residual is exhausted; and generate, based at least in part on the gradient boosted tree model and for a requesting computing device, one or more of one or more predictions or one or more proposed effects.

* * * * *